US010272476B2

(12) United States Patent
Aneson

(10) Patent No.: US 10,272,476 B2
(45) Date of Patent: Apr. 30, 2019

(54) METHOD OF DELIVERING INSECTICIDE

(71) Applicant: Sea Hawk Systems, LLC, Fort Lauderdale, FL (US)

(72) Inventor: John M. Aneson, Fort Lauderdale, FL (US)

(*) Notice: Subject to any disclaimer, the term of this patent is extended or adjusted under 35 U.S.C. 154(b) by 0 days.

(21) Appl. No.: 15/730,185

(22) Filed: Oct. 11, 2017

(65) Prior Publication Data
US 2018/0111168 A1    Apr. 26, 2018

Related U.S. Application Data

(60) Provisional application No. 62/411,053, filed on Oct. 21, 2016, provisional application No. 62/416,942, filed on Nov. 3, 2016.

(51) Int. Cl.
| | |
|---|---|
| *B67D 1/07* | (2006.01) |
| *A61L 2/18* | (2006.01) |
| *B08B 3/02* | (2006.01) |
| *B08B 9/027* | (2006.01) |
| *B67D 1/08* | (2006.01) |
| *B08B 3/10* | (2006.01) |
| *B08B 3/08* | (2006.01) |
| *A01M 7/00* | (2006.01) |
| *B67D 1/00* | (2006.01) |

(52) U.S. Cl.
CPC ............. *B08B 3/02* (2013.01); *B08B 3/08* (2013.01); *B08B 3/10* (2013.01); *B08B 9/027* (2013.01); *B67D 1/07* (2013.01); *B67D 1/08* (2013.01); *A01M 7/00* (2013.01); *B67D 1/0084* (2013.01); *B67D 2001/075* (2013.01)

(58) Field of Classification Search
CPC .... B08B 3/02; B08B 3/08; A61L 2/18; B67D 1/07; B67D 2001/075; B67D 1/0086
See application file for complete search history.

(56) References Cited

U.S. PATENT DOCUMENTS

| 8,123,079 B2* | 2/2012 | Schroeder | B67D 1/0086 222/108 |
| 8,721,880 B2* | 5/2014 | Worth | C02F 1/68 210/163 |
| 2018/0086620 A1* | 3/2018 | Smith | B67D 1/07 |

* cited by examiner

*Primary Examiner* — Sean E Conley
(74) *Attorney, Agent, or Firm* — Caesar Rivise, PC

(57) ABSTRACT

A method of delivering insecticide, comprises the steps of providing an insecticide in a container; allowing the insecticide to flow out of the container; and allowing the insecticide to flow into a drain beginning downstream of an opening in said drain.

7 Claims, 26 Drawing Sheets

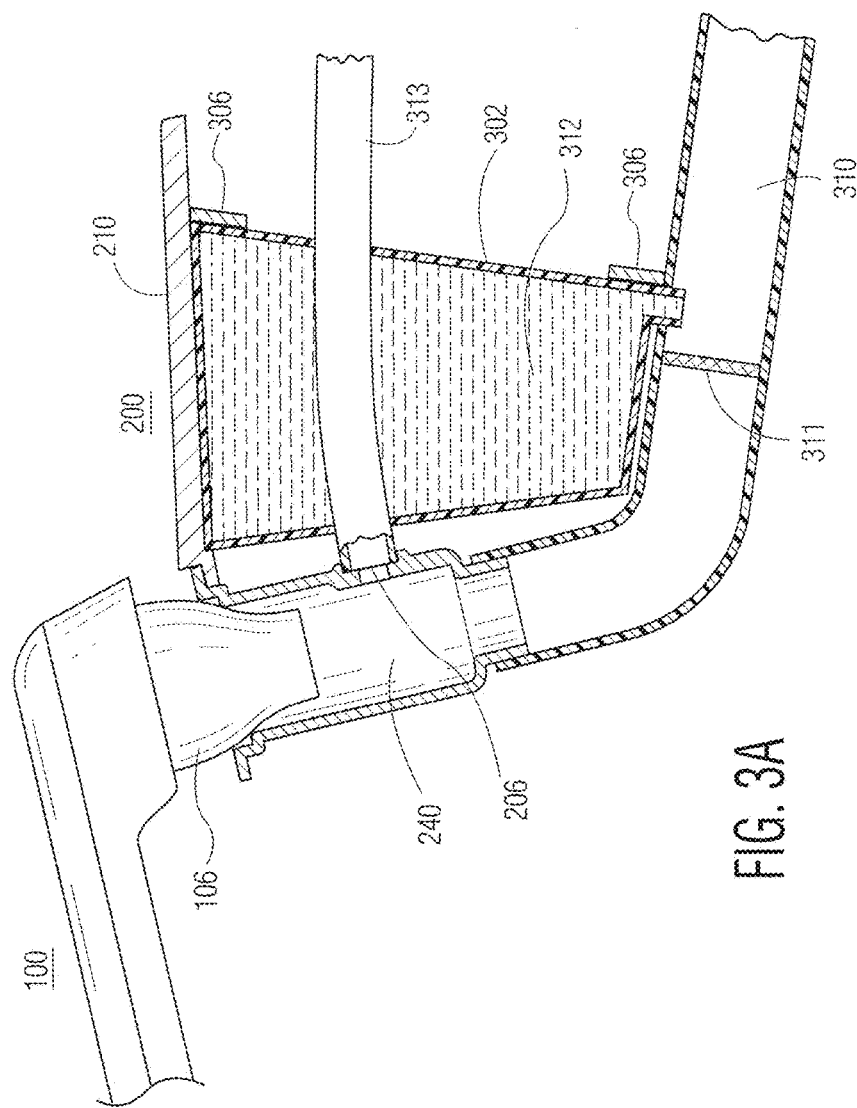

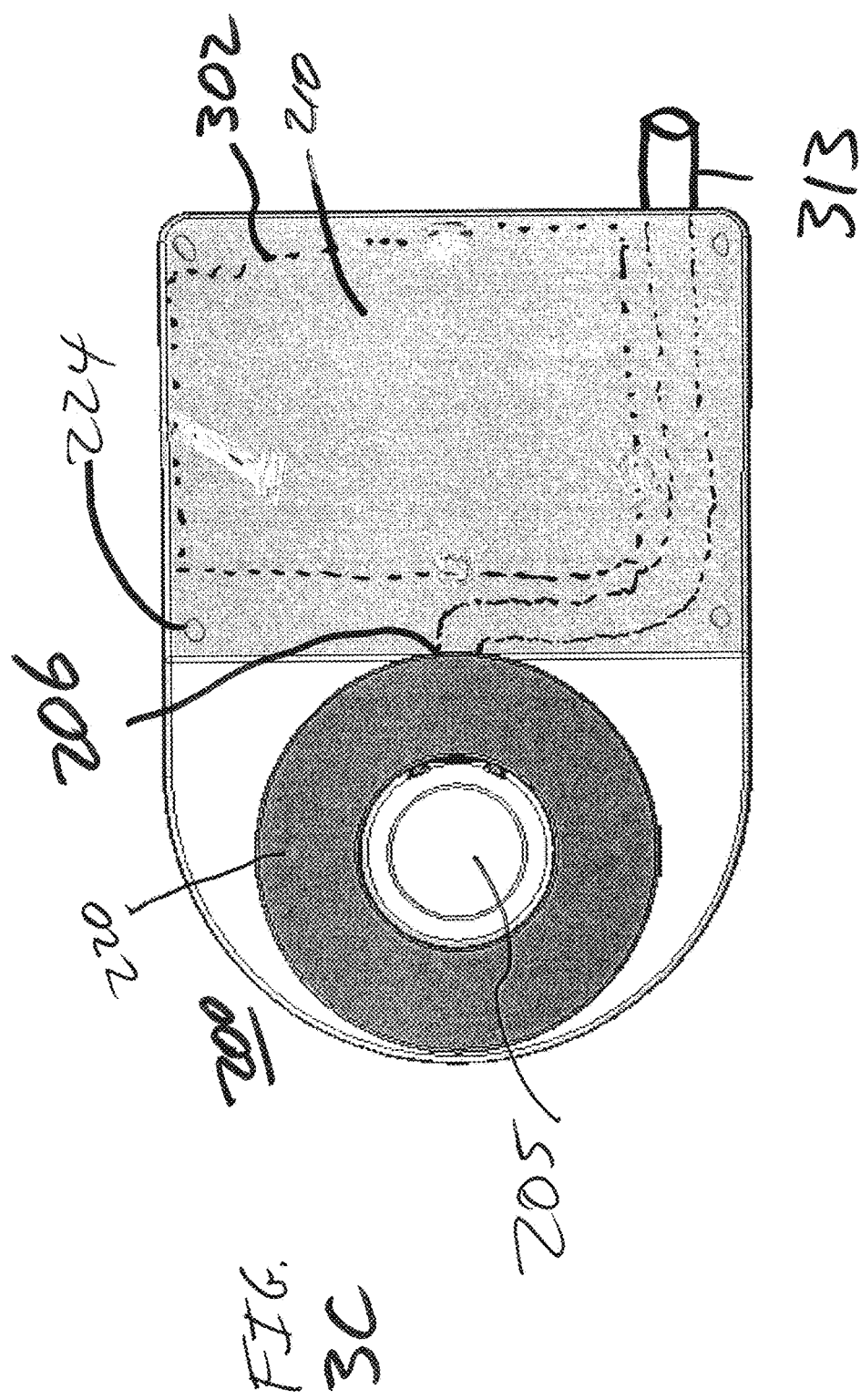

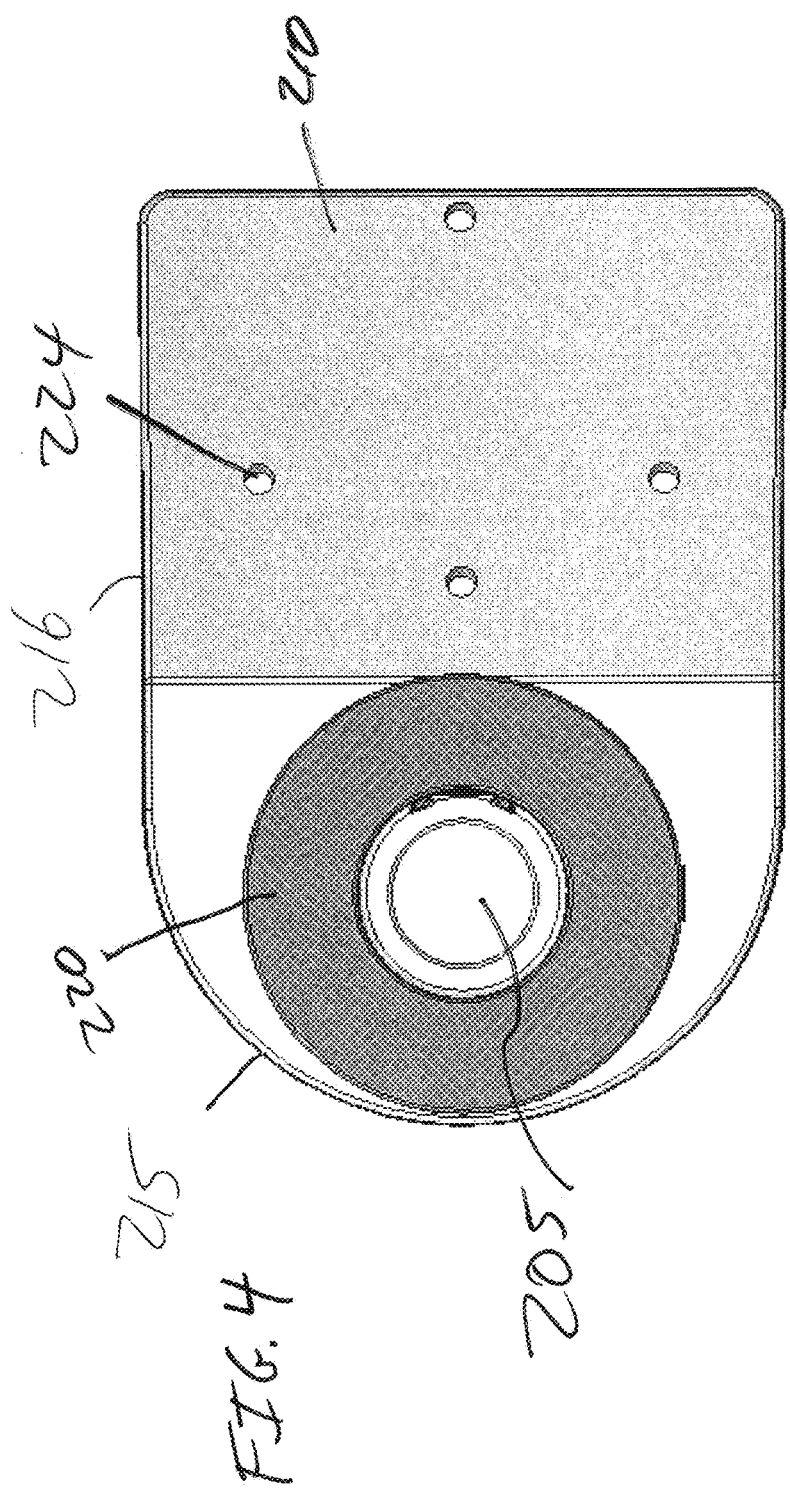

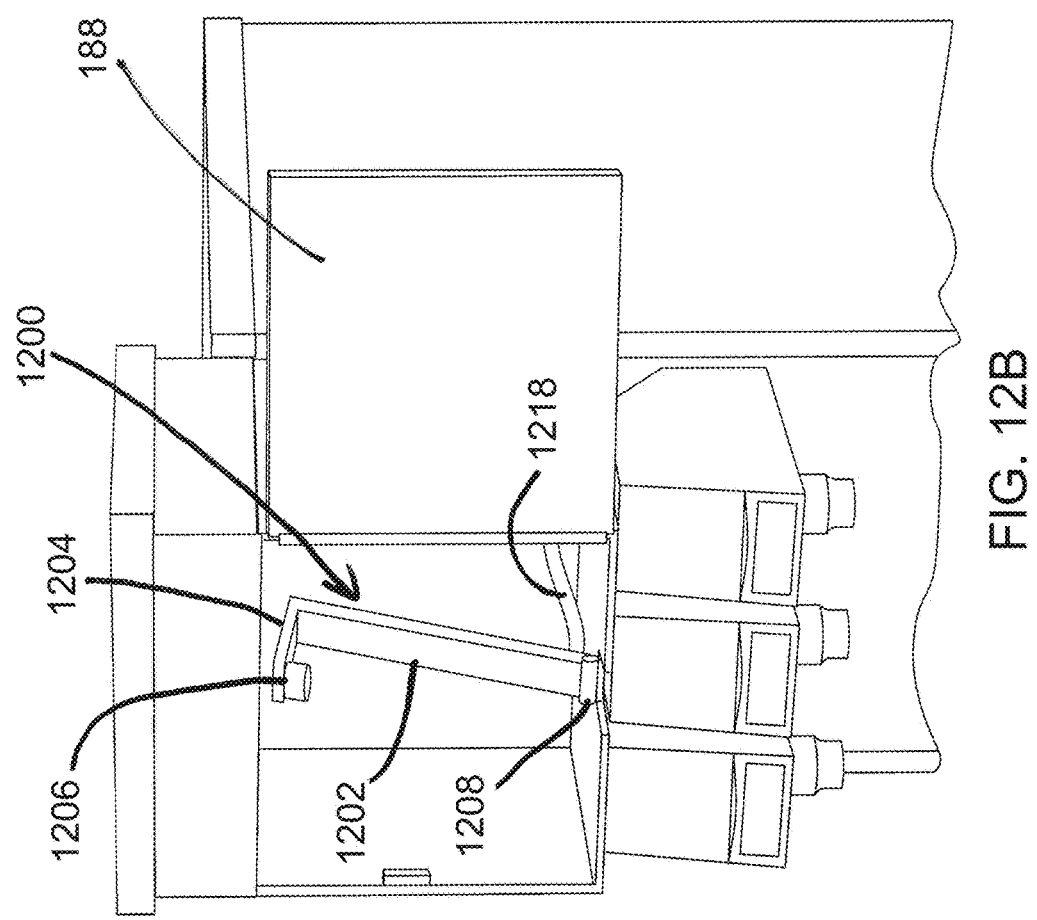

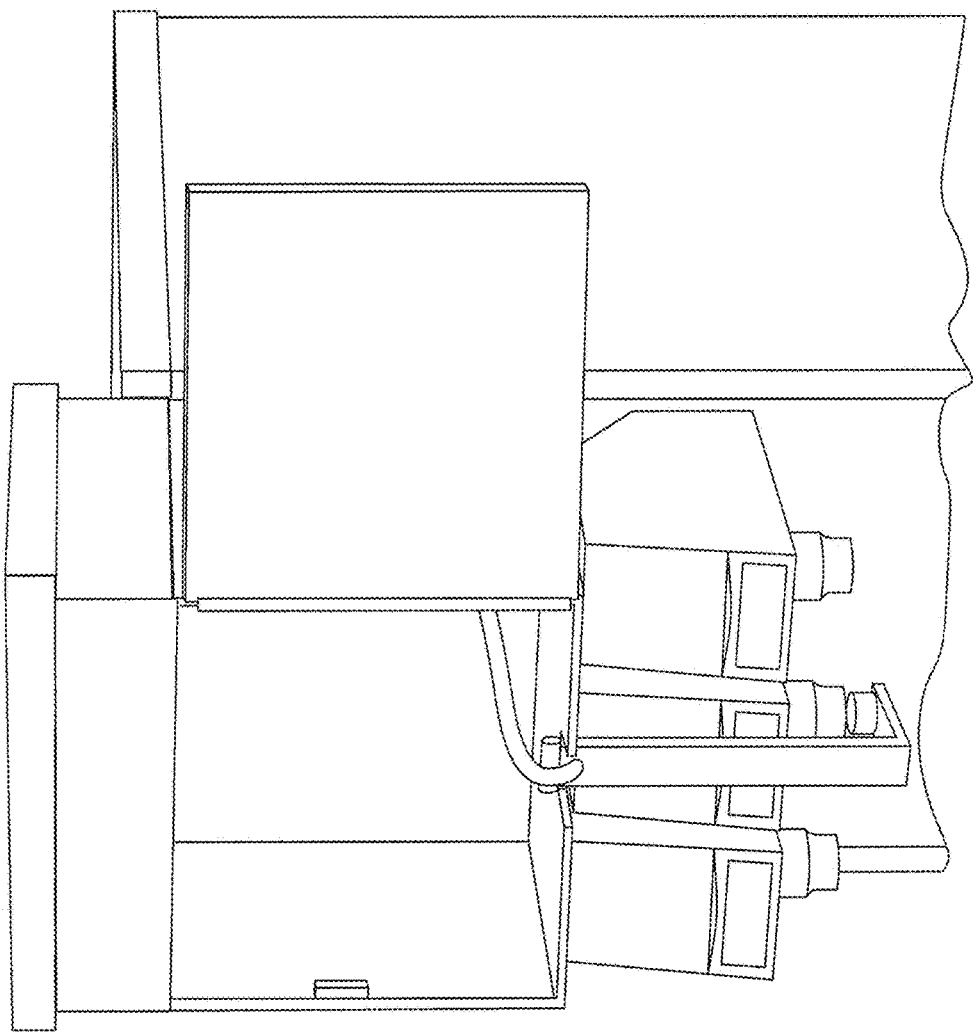

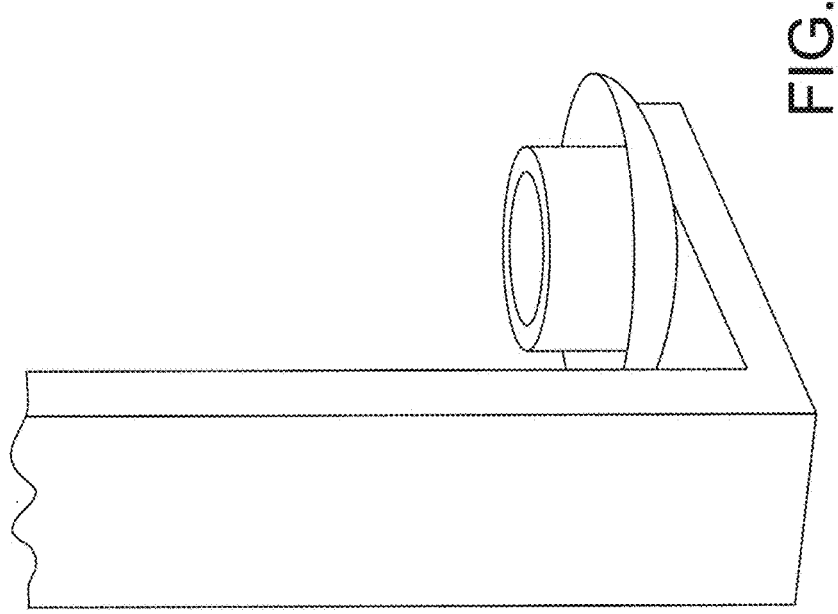

METHOD OF DELIVERING INSECTICIDE

This application claims the benefit of provisional applications 62/416,942 and 62/411,053 which are hereby incorporated by reference. This application incorporates by reference in its entirety U.S. patent application Ser. No. 14/935,664.

FIELD OF THE INVENTION

The present invention relates to beverage dispensers, and in particular to the cleaning of beverage dispensers and to the providing of a clean environment for a beverage dispenser. Specifically, a method and apparatus are disclosed for cleaning a dispenser which dispenses beverages and for maintaining the beverage dispenser in a clean environment.

BACKGROUND OF THE INVENTION

Restaurants, bars, and other types of food establishments use a dispenser in order to dispense beverages. FIG. 1 illustrates an exemplary prior art device that is used to dispense beverages and that is identified by several different names including a bar dispenser, a bar gun, and a soda gun. Dispenser 100 includes housing 104 with several pushbuttons 108 mounted thereon. Depending upon which pushbutton 108 is depressed, one of several beverages are dispensed (into a glass for example) via nozzle 106.

Dispenser 100 is coupled to a plurality of different beverages (or beverage ingredients) via inlet hose 102. Within inlet hose 102, a plurality of tubes (not shown) receive beverages (or beverage ingredients) from different sources. For example, one of the tubes within inlet hose 102 may be connected to a water source so that water can be dispensed from dispenser 100. Another tube within inlet hose 102 may be connected to a source of carbonated water. Other tubes within inlet hose 102 may be connected to containers storing concentrated beverage ingredients (e.g. concentrated soda flavorings). Dispenser 100 may mix one of the beverage ingredients with carbonated water to produce various types of flavored sodas (for example).

Pushbuttons 108 thus each correspond to various beverages such as water, carbonated water, or various flavored sodas. If pushbutton 108 corresponding to water or carbonated water is depressed, then water or carbonated water is dispensed through nozzle 106. If pushbutton 108 corresponding to a flavored soda is depressed, then concentrated soda flavoring and carbonated water are mixed within dispenser 100 and dispensed through nozzle 106. An exemplary dispenser is manufactured by Wunder-bar. A further exemplary dispenser is disclosed in Schroeder, U.S. Pat. No. 7,658,006, which is hereby incorporated by reference in its entirety.

At least some of the concentrated soda flavorings received by dispenser 100 include corn syrup as a sweetener. Thus, as various flavored sodas and/or other beverages are dispensed from nozzle 106, a residue which may include corn syrup remains on various surfaces of nozzle 106. Over time, the residue builds and nozzle 106 becomes unsanitary.

Also, the soda flavorings (and/or residue from the soda flavorings or other beverages) accumulate in a drain that is used to catch soda flavorings that are dispensed by dispenser 100 and that do not enter a glass or cup. For example, when dispenser 100 is resting on a holster when not in use, fluids will typically drip out of nozzle 106 and will flow down a drain. As the flavorings and/or residue flow down the drain, they will sometimes remain on drain surfaces. Consequently, fruit flies are attracted to the drain, multiply, and create an unhealthy environment. If not addressed, the fruit flies will fly out of the drain and into the area where the nozzle rests when not in use (e.g. in a holster). This is undesirable for a restaurant and/or bar venue. The resulting multitude of fruit flies is unclean, unhealthy, and is significantly disliked by both employees and customers. Presence of fruit flies in a bar and/or restaurant may result in reduced customers, reduced profits, and bad social media reviews.

Restaurants, bars, and other types of food establishments use a dispenser in order to dispense beverages. FIG. 19 illustrates an exemplary prior art device which is used to dispense beverages and which is identified by several different names including a beverage dispenser or a soda dispenser. Dispenser unit 50 includes a plurality of dispensers 100. Each dispenser 100 dispenses a different beverage, such as (for example) water, soda and/or juice.

Dispenser unit 50 is coupled to a plurality of different beverages (or beverage ingredients) via respective hoses. For example, one hose may be connected to a water source so that one dispenser 1100 can dispense water. Another hose may be connected to a source of carbonated water. Other hoses may be connected to containers storing concentrated beverage ingredients (e.g. concentrated soda flavorings). Each dispenser 100 may mix one of the beverage ingredients with carbonated water to produce various types of flavored sodas (for example).

Each dispenser 1100 may correspond to various beverages such as water, carbonated water, or various flavored sodas. Each dispenser may be labeled with the respective beverage that is dispenses. Each dispenser may include an actuator arm 1107 that controls a respective actuator. When an actuator arm 1107 is pushed backwards (by being pushed, for example, with a cup or glass), the beverage corresponding to the pushed actuator arm is dispensed. Each dispenser includes a respective nozzle from which the dispenser's respective beverage is dispensed. Pushing the actuator arm 1107 on a dispenser causes a beverage to be dispensed from that dispenser's respective nozzle 1106. If actuator arm 1107 corresponding to water or carbonated water is depressed, then water or carbonated water is dispensed through nozzle 1106. If actuator arm 1107 corresponding to a flavored soda is depressed, then concentrated soda flavoring and carbonated water are mixed within dispenser 1100 and dispensed through nozzle 1106. An exemplary dispenser is disclosed in U.S. Pat. No. 5,381,926, which is hereby incorporated by reference in its entirety.

Other prior art beverage dispensers use push buttons instead of actuator arm in order to dispense beverages. A cup is placed under nozzle 1106, the push button is pushed, and the beverage is dispensed into the cup.

At least some of the concentrated soda flavorings received by dispenser 1100 include corn syrup as a sweetener. Thus, as various flavored sodas are dispensed from nozzle 1106, a residue which includes corn syrup remains on various surfaces of nozzle 1106. Over time, the residue builds and nozzle 1106 becomes unsanitary.

SUMMARY OF THE INVENTION

A method of delivering insecticide comprises the steps of providing an insecticide in a container, allowing the insecticide to flow out of the container, and allowing the insecticide to flow into a drain beginning downstream of an opening in said drain.

A method and apparatus cleans a plurality of beverage dispensers which are located within a dispenser unit. A plurality of arms are rotatable with reference to beverage dispensers, respectively, so that a cleaning nozzle attached to each arm is situated under a respective dispenser nozzle. The cleaning nozzles are oriented to spray cleaning solution towards respective dispenser nozzles. At least one fluid valve and/or pump alternatively permits and blocks a cleaning solution to flow to the nozzles, respectively. A power supply provides flow signals to the at least one fluid valve and/or pump, respectively, wherein the valve(s) and/or pump transitions between permitting and not permitting flow of cleaning solution responsive to transitioning of the flow signals, respectively. A transmitter signals the power supply to transition the flow signals to cause the fluid valve(s) and/or pump to permit the cleaning solution to flow to the cleaning nozzles.

BRIEF DESCRIPTION OF THE DRAWINGS

FIG. 3A is a side cross sectional view of a beverage dispenser and a drain solution (liquid) in accordance with a further exemplary embodiment of the present invention.

FIG. 3C is a top view of the beverage dispenser and drain solution (liquid) of FIGS. 3A and 3B in accordance with the further exemplary embodiment of the present invention.

FIG. 4 is a top view of a holster for supporting a beverage dispenser in accordance with an exemplary embodiment of the present invention.

FIG. 12A illustrates the use of doors to store a cleaning apparatus when not in use.

FIG. 12B is a perspective drawing of a beverage dispenser cleaning apparatus in accordance with a further exemplary embodiment of the present invention. FIG. 12B illustrates the exemplary cleaning apparatus in a first position.

FIG. 12C illustrates the exemplary cleaning apparatus in a second position.

FIG. 12D is a perspective drawing of a beverage dispenser cleaning apparatus in accordance with the further exemplary embodiment of the present invention. FIG. 12D illustrates the exemplary cleaning apparatus in a third position.

FIG. 14 is a perspective view of an alternative embodiment with regard to the cleaning nozzle shown in the previous figures.

DETAILED DESCRIPTION OF THE INVENTION

Figure 2A:
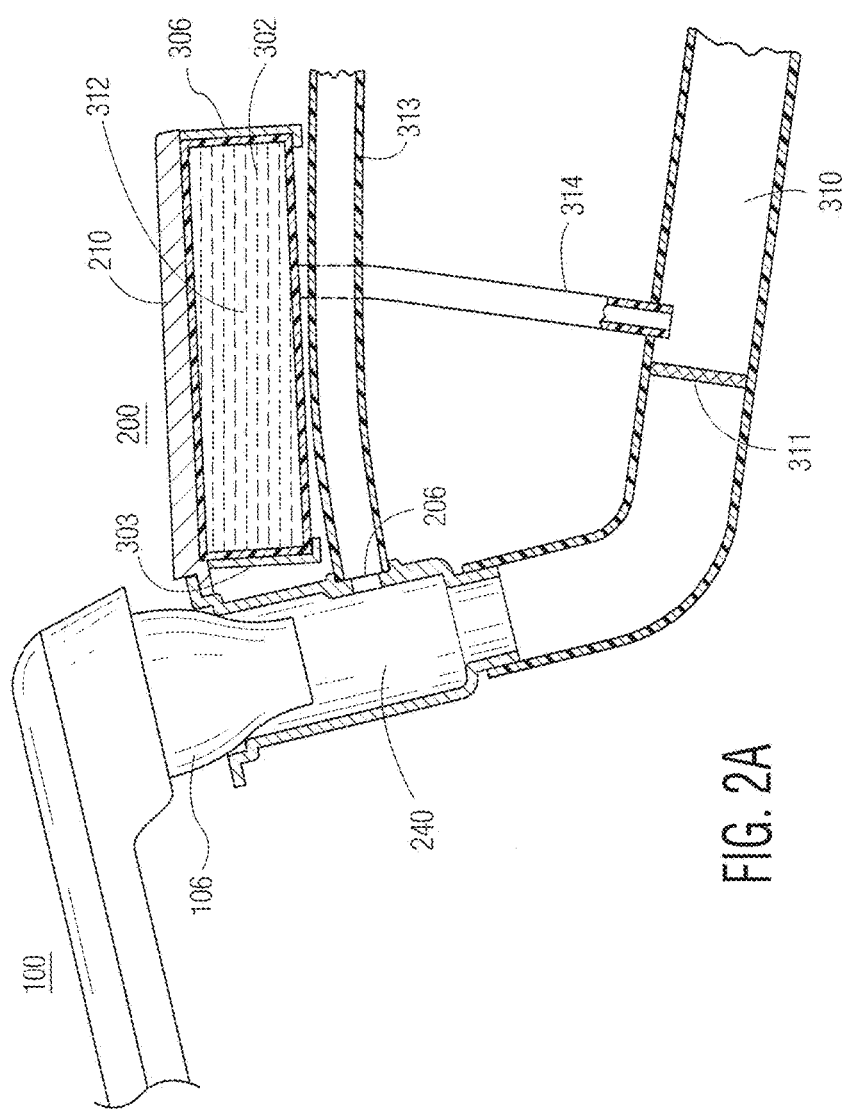
FIG. 2A is a side cross sectional view of a beverage dispenser and a drain solution (liquid) in accordance with an exemplary embodiment of the present invention.

FIG. 2A illustrates a further exemplary embodiment of the present invention.

Figure 2B:
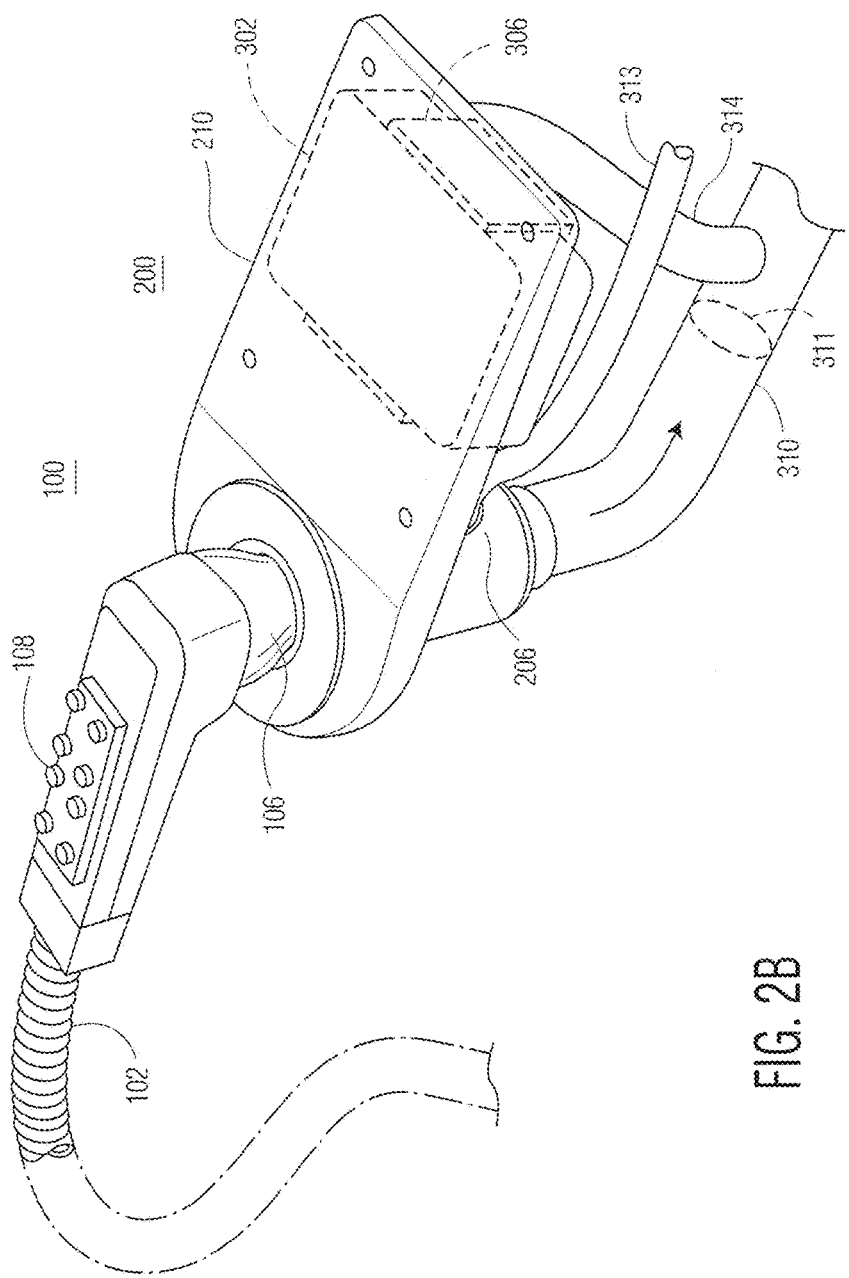
FIG. 2B is a perspective view of the beverage dispenser and drain solution (liquid) of FIG. 2A in accordance with an exemplary embodiment of the present invention

As shown in FIG. 2A and FIG. 2B, and as previously described, dispenser 100 has been stored on top of (and partially within) holster 200. Dispenser 100 includes pushbuttons 108 that may be depressed for dispensing different types of beverages. The various types of beverages flow into dispenser 100 via inlet hose 102. Holster 200 includes back ledge 210 which may be mounted, for example, to the underside of a countertop such as a bar countertop.

During use, and as previously described, beverages flow out of dispenser 100 (and are thus discharged through nozzle 106) based on which pushbutton 108 is depressed. Some beverages, however, flow down drain 310 when dispenser 100 is inserted into holster 200 after a beverage has been dispensed (and while discharge from nozzle 106 is still occurring). After a period of time, small quantities of the beverages that have been dispensed from dispenser 100 will accumulate within drain 310. The beverages that have been dispensed from dispenser 100 typically include corn syrup.

Various types of insects, such as fruit flies, are often attracted to corn syrup. Thus, fruit flies will typically accumulate and breed within drain 310.

As previously described, as the fruit flies continue to breed and accumulate within drain 310, fruit flies will eventually fly out of drain 310 and to the location where drain 310 is connected to holster 200. The fruit flies will fly out of holster 200 and will begin to fly around the bar and/or restaurant area where dispenser 100 is being used. Such an accumulation of fruit flies is disturbing to both customers and employees. Customers that see fruit flies in a bar and/or restaurant establishment may not return in the future. Thus, the accumulation of fruit flies in the area where dispenser 100 is being used is undesirable.

In accordance with an exemplary embodiment of the present invention, container 302 is included. Container 302 includes a chemical or solution 312 that eliminates insects such as fruit flies. Solution 312 may therefore be what is known as an insecticide, namely a substance that kills insects. A small opening may be found at the bottom of container 302 so that solution 312 that is stored in container 302 and that eliminates fruit flies slowly enters drain 310. As shown, support member 306 is coupled to holster 200. Container 302 sits within support members 303, 306 with the opening of container 302 facing downwards, in the direction of gravity. Solution 312 slowly flows out of container 302, through drain tube 314, and into drain 310 at secondary drain opening 316. While beverages dispensed from dispenser 100 (or having a residual amount dripping out of dispenser 100) first enter drain 310 at the point where holster outlet 204 meets drain 310, solution 312 is first introduced into drain 310 at a location past the point where holster outlet 204 and drain 310 meet. That location past the point where holster outlet 204 and drain 310 meet is considered to be "downstream" from holster outlet 204. In particular, residue and/or waste moves downstream as follows through drain 310. Downstream flow through drain 310 normally occurs under the force of gravity, although it may be accomplished with a pump (or suction) as well. Thus, solution 312 first enters drain 310 downstream of where fluid or residue exiting nozzle 106 first enters drain 310. As solution 312 slowly drips into drain 310, any fruit flies resident within drain 310 are eliminated.

Depending on the composition of solution 312, solution 312 may be used against insect eggs and larvae. With regard to fruit flies, solution 312 may be used against, for example, fruit fly eggs. In an exemplary embodiment of the present invention, solution 312 is Permethrin. Permethrin is one example of the insecticide that may be used for solution 312. It is understood, however, that other insecticides may be used in place of, or in addition to permethrin. Exemplary other insecticides that may be used within solution 312 include, for example, Methoprene, Pyrethrin, and Pyrethrum. Again, these are merely exemplary as other insecticides may also be used for solution 312.

Solution 312 slowly drips out of container 302. Thus, at regular intervals (for example), container 302 is regularly refilled with insecticide so that elimination of fruit flies, and other insects, in drain 310 may occur on a continuous basis.

In one exemplary embodiment of the present invention, solution 312 is poured into container 302, and from there, solution 312 enter drain 310. Container 302 can be refilled at any desired time, including when container 302 is empty. In particular, container 302 can be removed from support members 303, 306, refilled with solution 312, and then reinserted into position by support members 303, 306. There are various ways to determine when container 302 may be refilled. In one embodiment, container 302 is refilled on a regular basis (e.g. daily, weekly, etc.). In another embodiment, container 302 is refilled when the level of solution 312 in container 302 has dropped below a certain level (which can be observed through visual inspection or measured using, for example, an electronic sensor). In a further exemplary embodiment of the present invention, an opening is accessible to the interior of container 302 so that container 302 can be filled with solution 312 while remaining in place by support members 303, 306.

FIG. 2A illustrates container 302 attached to the underside of holster 200. In the exemplary embodiment shown in FIG. 2A, solution 312 flows into drain 310 via drain tube 314. Furthermore, in accordance with a further exemplary embodiment of the present invention, backflow prevention device 311 is included. Backflow prevention device 311 prevent solution 312 (which may be an insecticide) from splashing upwards and entering holster interior 240. In the exemplary embodiment shown in FIG. 2A and FIG. to be, cleaning solution flows through fluid to 313 and towards nozzle 106. In this manner, nozzle 106 is cleaned. The cleaning of nozzle 106 is further described in U.S. patent application Ser. No. 14/935,664 which is hereby Incorporated by reference in its entirety. Thus, cleaning solution flows through fluid tube 313, and into holster interior 240 via holster inlet 206. After reaching holster interior 240, the cleaning solution flows towards nozzle 106 through various methods and/or structures. One exemplary structure is described in U.S. application Ser. No. 14/935,664. Another exemplary structure is described below.

As further illustrated in FIG. 2B, fluid tube 313 is located below container 302. In FIG. 2B, it can be seen that solution 312 flows into drain 310 via drain tube 314.

FIG. 3A illustrates a further exemplary embodiment of the present invention. In FIG. 3A, and contrast with FIG. 2A, fluid tube 313 is located on a side of container 302. This exemplary embodiment enables container 302 to have more vertical depth than the exemplary embodiment illustrated in FIG. 2A. However, in some situations, the configuration shown in FIG. 2A may be preferred. As shown in FIG. 3A, support member 306 is included for keeping container 302 in place. Furthermore, in the embodiment shown in FIG. 3A, as container 302 extends all the way down to drain 310, drain tube 314 may be shortened or possibly eliminated. Also, as shown in FIG. 3A, optional backflow prevention device 311 may be included similarly as is done in the embodiment illustrated in FIG. 2A.

In FIG. 3A, container 302 extends all the way down to drain 310. It is understood, however, that container 302 may have various lengths, widths, and shapes. Container 302 may extend only part way down towards drain 310. Alternately, container 302 may have a height that does not extend all the way up to back ledge 210.

Figure 3B:
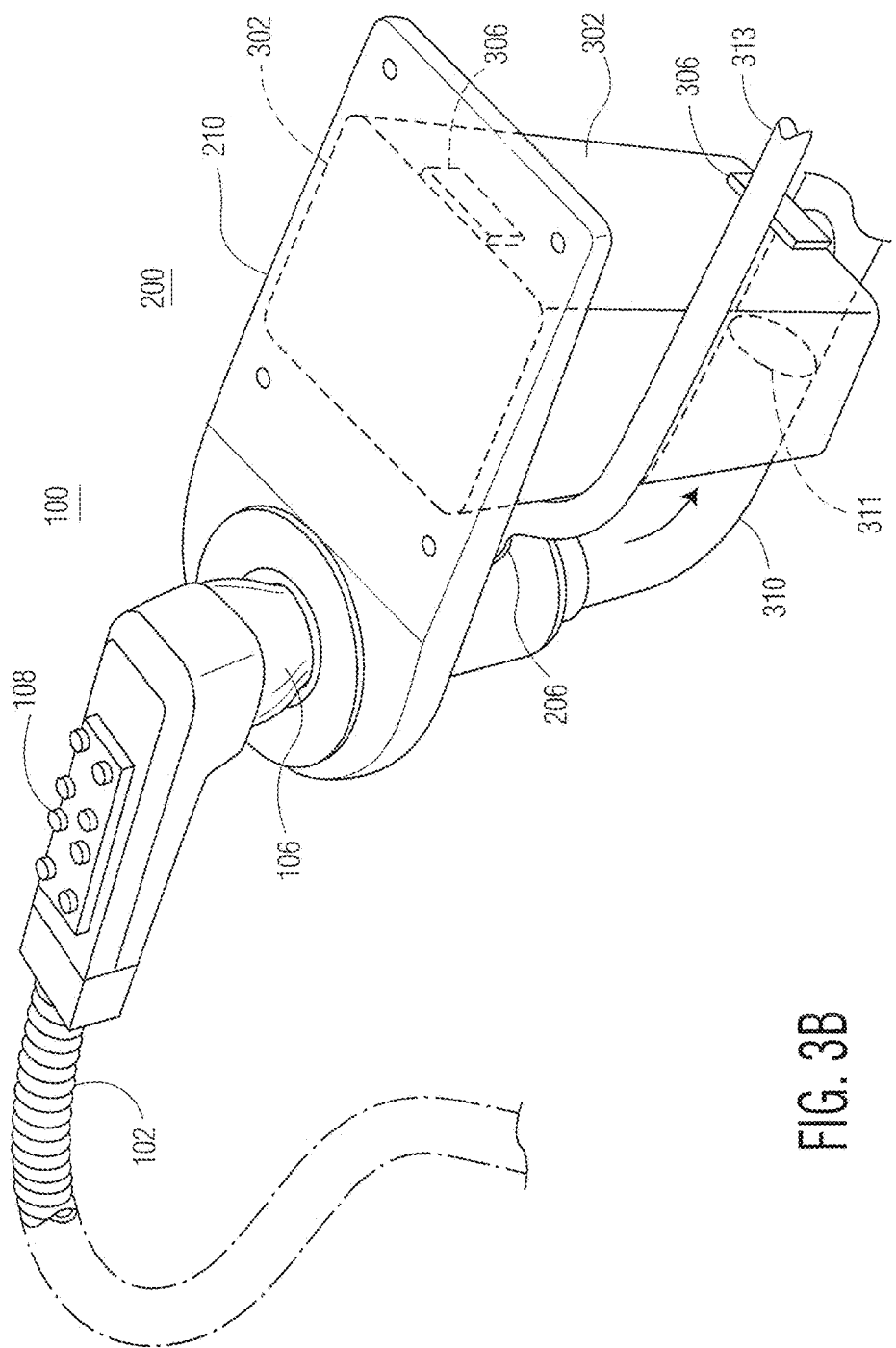
FIG. 3B is a perspective view of the beverage dispenser and drain solution (liquid) of FIG. 3A in accordance with the further exemplary embodiment of the present invention.

FIG. 3B illustrates the exemplary embodiment shown in FIG. 3A but from a perspective view. As is again illustrated in FIG. 3B, fluid tube 313 may extend along the side of container 302.

FIG. 3C is a top view of holster 200 which again illustrates that fluid tube 313 may be situated along the side of container 302.

Thus, in accordance with the embodiments described above, fluid tube 313 may be situated below container 302. In a further exemplary embodiment, fluid tube 313 may be situated on either side of container 302. In yet a further exemplary embodiment of the present invention, fluid tube 313 may be situated above container 302.

In the exemplary embodiments described above, solution 312 may flow into drain 310 via gravity. It is understood, however, that solution 312 may be introduced into drain 310 through the use of other mechanisms, such as a pump. An exemplary pump can be powered through various means including, for example, electricity.

Container 302 has been described an illustrated as being attached to, or coupled to holster 200, however this is merely exemplary. In a further exemplary embodiment of the present invention, container 302 is not attached to holster 200 but is instead in a location that is not in contact with holster 200.

In one exemplary embodiment, the solution/fluid that flows through fluid tube 313 is water. It is understood, however, that other types of solutions may be used as well. Desirable solutions are solutions that are safe for human consumption. Thus, a food grade solution is desirable.

Exemplary food grade solutions include chlorine bleach (diluted), hydrogen peroxide (3%), and white distilled vinegar (5%). As explained in U.S. patent application Ser. No. 14/935,664, other solutions may be used as well. The solution flowing through fluid tube 313 does so under pressure. Pressure can be supplied by a municipal water source or by a pump. Such a pump is described, and exemplary control thereof is described in U.S. patent application Ser. No. 14/935,664

As previously explained, beverage dispenser 100 normally sits within holster 200 when not in use. A top view of an exemplary holster is shown in FIG. 4. FIG. 4 illustrates holster top member 209 that includes front member 215 and back member 216. Holster front member 215 includes holster opening 205 into which nozzle 106 is inserted when dispenser 100 is not in use. Back member 216 may be attached to the underside of a counter by driving screws or bolts into faster openings 224 (for example). FIG. 4 also illustrates gasket 220. Gasket 220 may be comprised of a material that allows a seal to be formed, such as rubber. When nozzle 106 is inserted into holster opening 205, and a cleaning solution is sprayed into the interior of nozzle 106 for cleaning purposes, gasket 220 helps to prevent cleaning solution from spraying out of holster 200 through holster opening 205.

Figure 5:
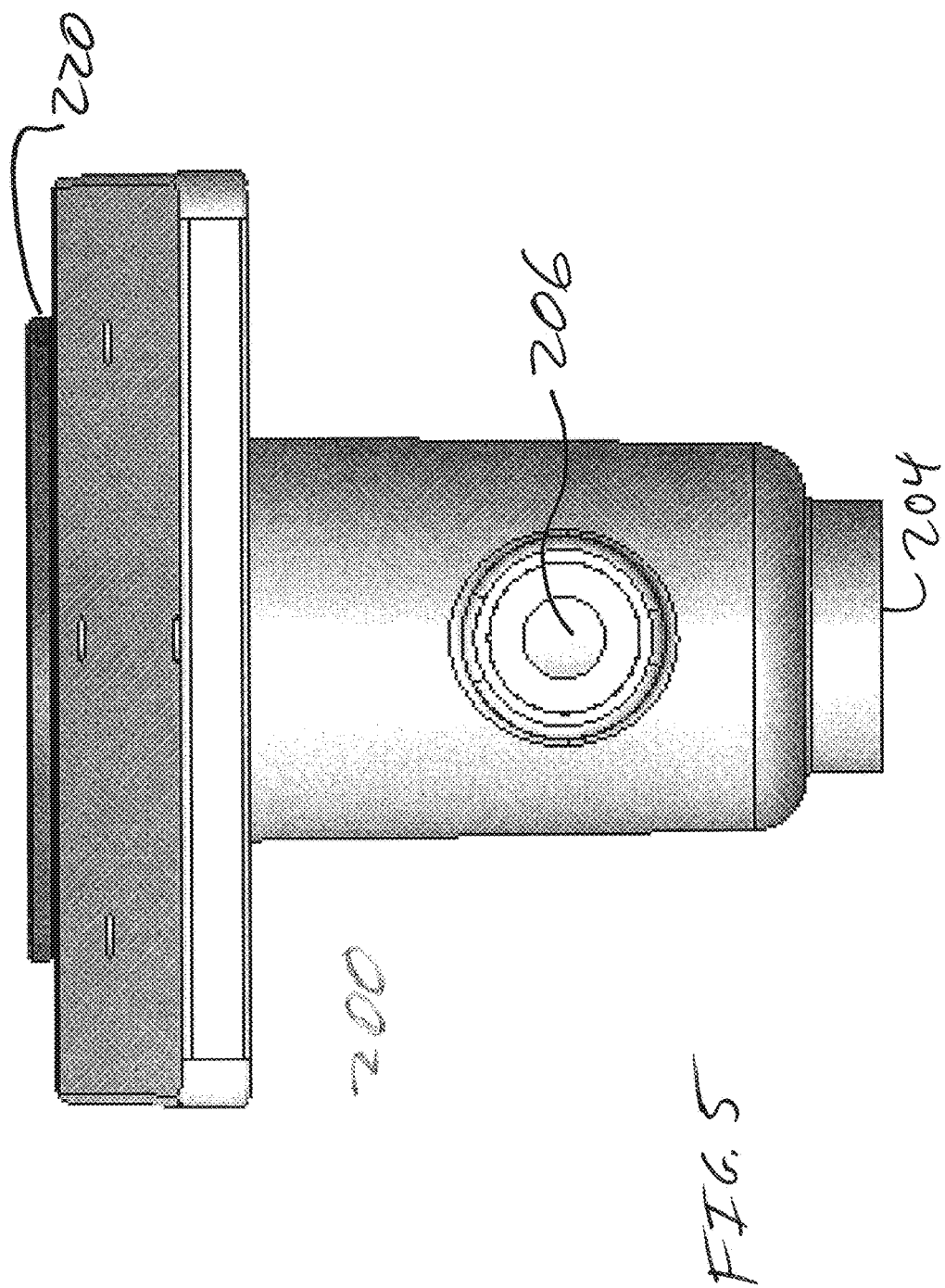
FIG. 5 is a side view of a holster for supporting a beverage dispenser in accordance with an exemplary embodiment of the present invention.

FIG. 5 is a side view of holster 200. Below holster top member 209 and coupled thereto is holster bottom member 218. Bottom member 218 includes holster inlet 206 which is an opening into the interior of holster 200. Holster 200 also includes holster outlet 204. In actual use, a cleaning solution (water or another type of fluid) flows into holster 200 via holster inlet 206. In an exemplary embodiment of the present invention, after flowing through holster inlet 206, the cleaning solution flows upwards within holster 200 (i.e. within holster interior 240) until the solution reaches nozzle 106. After being sprayed into nozzle 106, the fluid then flows out of holster 200 via holster outlet 204. In FIG. 5, gasket 220 is again shown on the top surface of holster 200.

Figure 6:
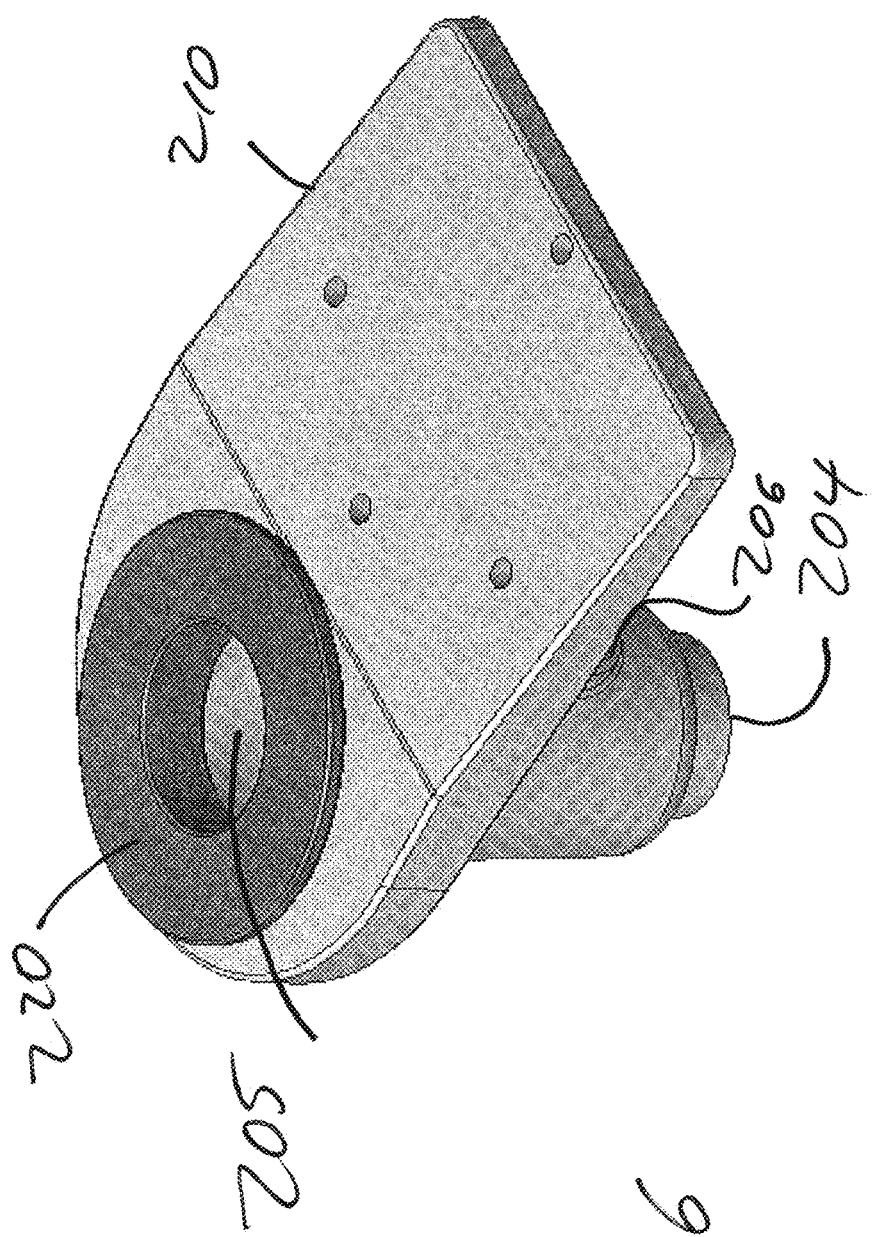
FIG. 6 is a perspective view of a holster for supporting a beverage dispenser in accordance with an exemplary embodiment of the present invention.

FIG. 6 is a perspective view of holster 200. Holster inlet 206 is partially shown but mostly obscured in this figure. Back ledge 210 may be attached to the underside of a counter such as a bar counter. Holster outlet 204 appears at the bottom of holster 200 and is an opening through which cleaning solution exits from holster 200 after cleaning solution has been sprayed into nozzle 106. Gasket 220 is shown on the top surface of holster 200. Holster opening 205 appears. Nozzle 106 of dispenser 100 is inserted into holster opening 205 when not dispensing beverages.

Figure 7:
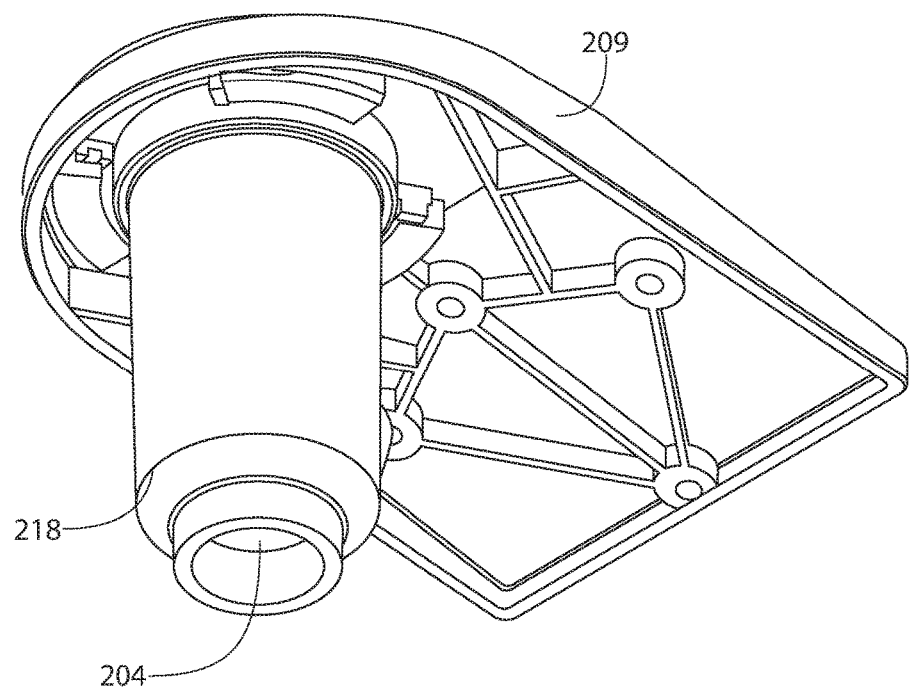
FIG. 7 is a perspective view of the underside of a holster for supporting a beverage dispenser in accordance with an exemplary embodiment of the present invention.

FIG. 7 is a further perspective view of holster 200 which is taken from a point below holster 200. FIG. 7 shows that holster 200 is comprised of several components, including top member 209 (that includes back ledge 210) and bottom member 218. Top member 209 and bottom member 234 may each be manufactured separately and then coupled together to form holster 200. Holster 200 may be formed of a resin such as plastic and the components thereof may be manufactured using a manufacturing process such as injection molding. The composition and method of manufacturing holster 200 are merely exemplary as it is understood that other materials and manufacturing processes may be used.

Figure 8:
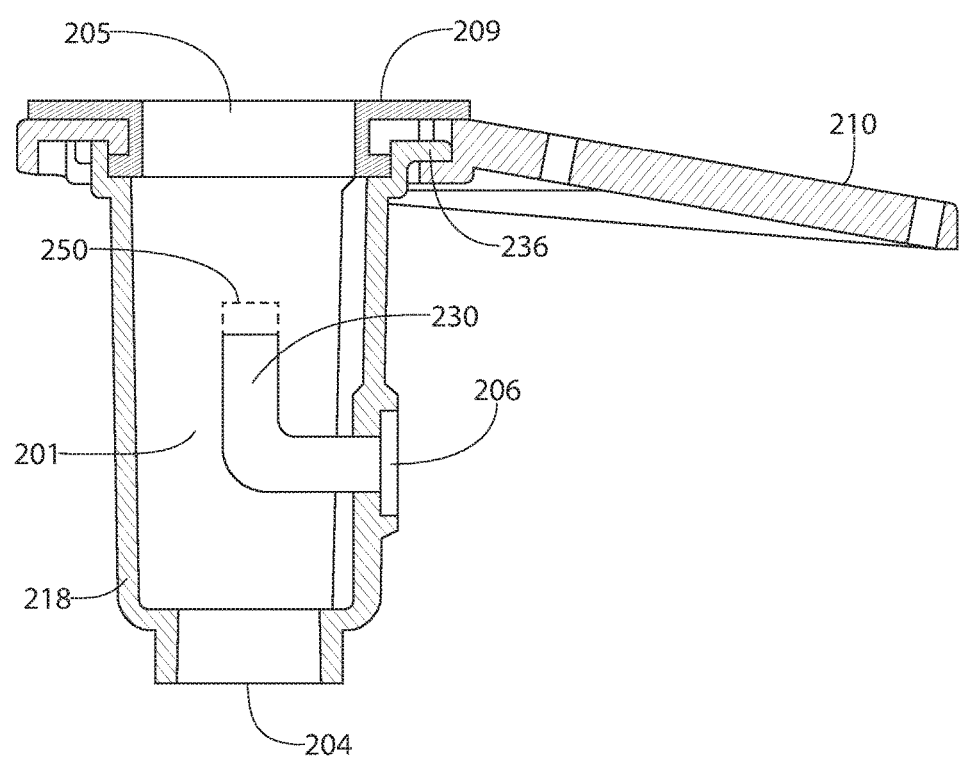
FIG. 8 is a cross-sectional side view of the holster that is illustrated in FIGS. 4 through 7.

FIG. 8 is a cross-sectional side view of holster 200. In FIG. 8, it can again be seen that holster 200 is comprised of top member 209 and bottom member 218. Top member 209 and bottom member 218 may be joined together in a variety of different ways. In one exemplary embodiment, top member 209 includes slots 236 which are engaged by tabs that project from the top of lower member 218. Holster 200 includes interior 201 in which nozzle 106 of dispenser 100 is cleaned. In order to clean nozzle 106, elbow member 230 may be included within compartment 201, although the configuration of elbow member 230 is merely exemplary. Also, as illustrated, elbow member 230 is coupled to holster inlet 206.

During actual operation, nozzle 106 of dispenser 100 is inserted into holster 200 via holster opening 205. In this manner, nozzle 106 directly faces the opening of elbow member 230 that is projecting upwards within compartment 201. A cleaning solution is allowed to flow into holster inlet 206. The cleaning solution then flows through elbow member 230 and exits elbow member 230 at a top opening thereof. The cleaning solution (fluid), under pressure, continues to rise within compartment 201 until it reaches nozzle 106. The cleaning solution continues to be sprayed onto nozzle 106 for a predetermined amount of time, and then flow of the cleaning solution is terminated. As the fluid cleans nozzle 106, the fluid then drops under the force of gravity to the bottom of compartment 201. The fluid then exits compartment 201 via holster outlet 204. The fluid can then be coupled to a municipal drain or to a storage container for later reuse, recycling, or to be discarded.

In a further exemplary embodiment of the present invention, cleaning solution is introduced into compartment 201 at another location before making contact with nozzle 106. For example, cleaning solution may be introduced into compartment 201 at a location that is above holster outlet 204. As the cleaning solution is under pressure, the cleaning solution will again be sprayed upwards and make contact with nozzle 106 before falling under gravity and exiting holster 200 via holster outlet 204.

FIG. 8 also illustrates the use of cleaning nozzle 250 that while optional is preferred. Cleaning nozzle 250 sprays cleaning solution towards nozzle 106 with a spray pattern. In exemplary embodiments of the present invention, the spray pattern is between a 15 degree and a 30 degree pattern, although a 30 degree pattern is preferred.

The previous explanation has described the use of a pump to spray cleaning solution towards nozzle 106 under pressure, although the use of a pump may be optional depending upon the source of the cleaning solution. For example, if the cleaning solution is water that is obtained from a public water source, the water will be pumped under pressure and the water will thus enter elbow member (or enter into interior 201) under pressure. A typical public water source will provide water at a pressure of 40 pounds per square inch (psi), and at that pressure the pressure is sufficient to spray water into up to four holsters 200 simultaneously (and to thus clean four nozzles 106 simultaneously). In other words, a minimum of 10 psi of cleaning solution per nozzle 106 is desirable. In such an exemplary embodiment, a valve and solenoid may be used to simply apply the pressurized water to multiple holsters 200. In such an embodiment, once pressurized water flows through a solenoid operated valve, the water is directed through y-connections (for example) so that it is simultaneously applied to multiple holsters 200 (and to clean multiple nozzles 106). To direct the water (or other cleaning solution) at more than four holsters, the use of a pump in order to increase water (or other cleaning solution) pressure is desirable.

The use of elbow member 230 is merely exemplary. Other mechanisms may be used for spraying cleaning solution into nozzle 106, such as is described in U.S. patent application Ser. No. 14/935,664.

Figure 9:
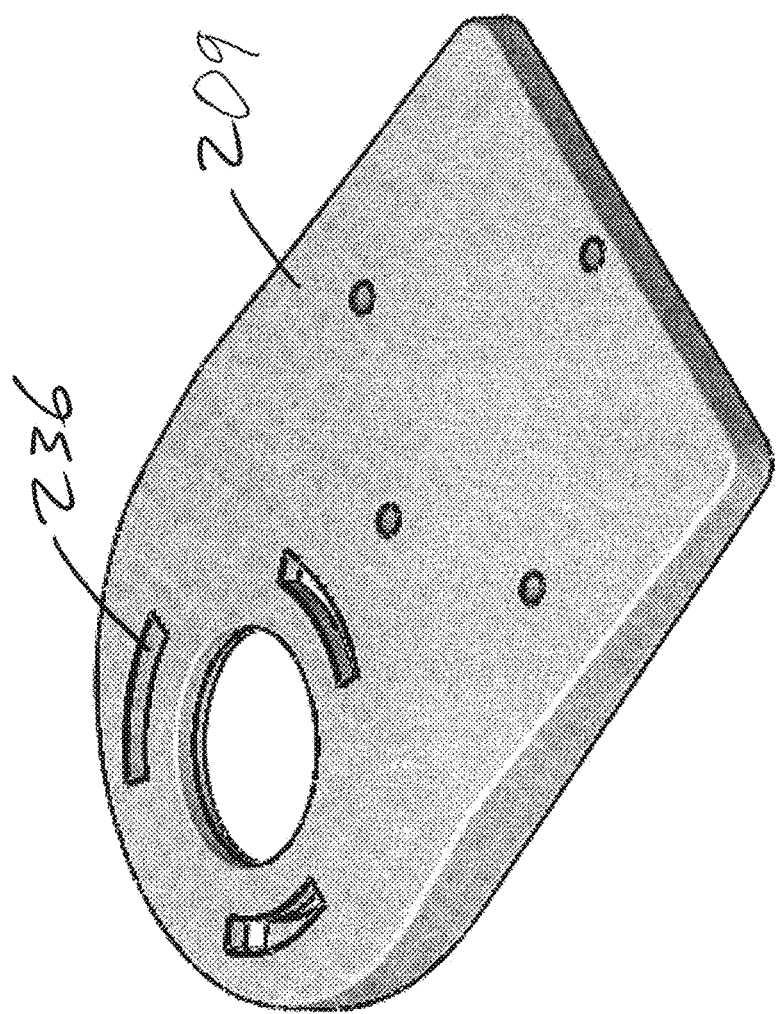
FIG. 9 is a perspective view of a portion of the holster illustrated in FIGS. 4 through 7.

FIG. 9 is a perspective view of top member 209. As shown in FIG. 9, top member 209 includes slots 236 which are engaged by tabs that extend from the top of bottom member 218. Again, the use of slots 236 and tabs is merely exemplary as one method of attaching top member 209 and bottom member 218.

Figure 10:
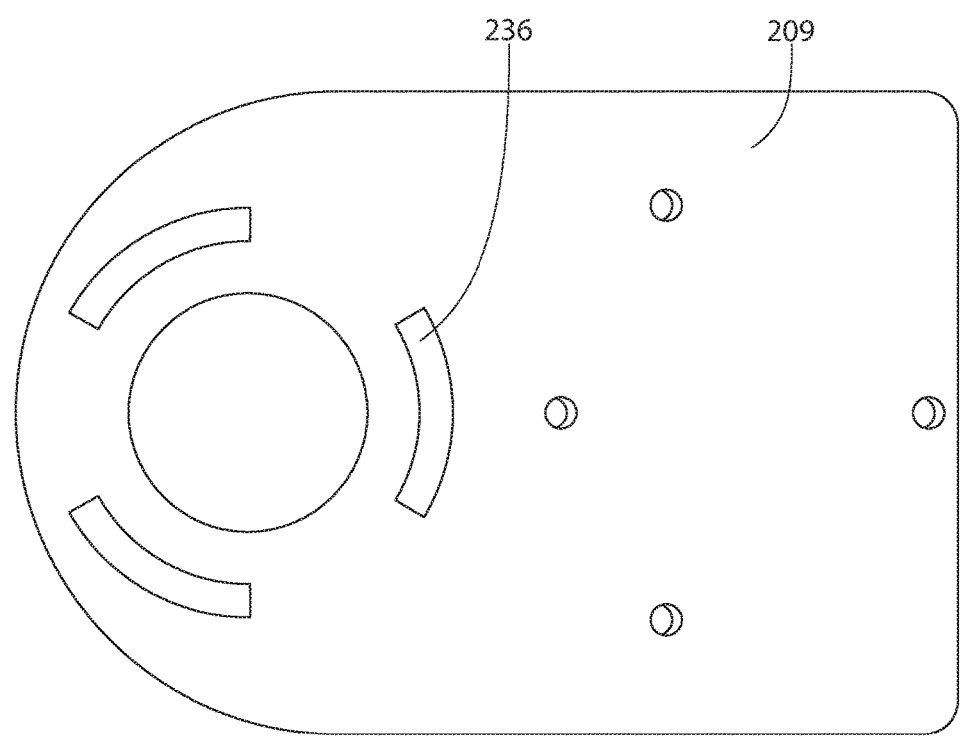
FIG. 10 is a top view of a portion of the holster that is illustrated in FIGS. 4 through 7.

FIG. 10 is a top view of top member 209 which again shows exemplary slots 236.

Figure 11:
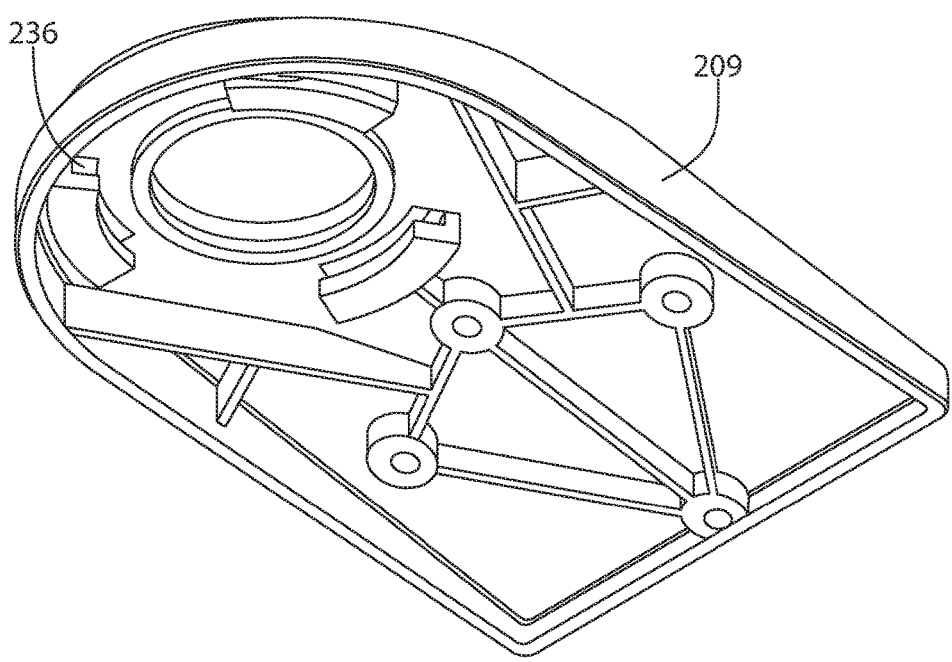
FIG. 11 is a perspective view of the underside of a portion of the holster that is illustrated in FIGS. 4 through 7.

FIG. 11 is a perspective view of top member 209 taken from a point below top member 209. Again, exemplary slots 236 are shown.

In a further exemplary embodiment, a light is included to illuminate container 302. In this manner, it can be readily seen that a method and/or apparatus is in place to control insects such as fruit flies. Being able to see that container 302 is in place may be comforting to customers and employees. Such lighting may also arouse interest to a prospective purchaser.

The holster described above may be used in combination with the method and/or apparatus for cleaning beverage dispensers that is described in U.S. patent application Ser. No. 14/935,664. It is understood, however, that the method and/or apparatus described in Ser. No. 14/935,664 is merely exemplary, and the holster described above may be used in combination with other apparatuses and/or methods.

Over time, as dispensers 1100 are used, residue builds on surfaces of nozzles 106, and that residue may have adverse consequences. Bacteria and/or mold may grow on the residue. The residue may attract insects such as fruit flies. When beverages are contaminated with bacteria, mold or insects, the beverages can cause sickness and disease. Furthermore, the taste of the beverage being dispensed through the residue may be adversely affected. The residue can block beverages flowing through nozzle 1106, thus reducing the flow rate of beverages being dispensed. This may increase the amount of time needed to dispense beverages. Residue creating a blockage within dispenser 1100 can alter the ratio of carbonated water and concentrated soda flavoring which are mixed together, thus causing a flavored soda to be dispensed which has either not enough flavoring or too much flavoring; the result is the dispensing of a beverage which does not have its expected taste. A buildup of debris over time can also shorten equipment life.

The residue which collects on surfaces of nozzles 1106 can thus have numerous consequences, including:

1) If beverages do not taste good, then customers are dissatisfied, and they may stop purchasing beverages at the establishment that is selling the beverages (or may even stop being customers of the establishment entirely). Furthermore, poor reviews of the establishment may appear on social media if the beverages do not taste good;
2) The residue on the surfaces of the dispenser looks unappealing and unappetizing, and customers will not want to purchase or drink beverages dispensed through the residue;
3) A "board of health" type of inspection of dispenser 1100 may result in a government entity prohibiting use of the dispenser until it has been adequately cleaned;
4) If the residue slows down beverage dispensing, then the rate at which beverages are sold may be reduced. This reduction can adversely affect profits.
5) The residue can cause soda to be dispensed with not enough or too much carbonated water.
6) The residue can shorten equipment life.

It is thus desirable for each nozzle 1106 to be clean and for any residue which appears on nozzle 1106 to be removed.

Figure 12A:
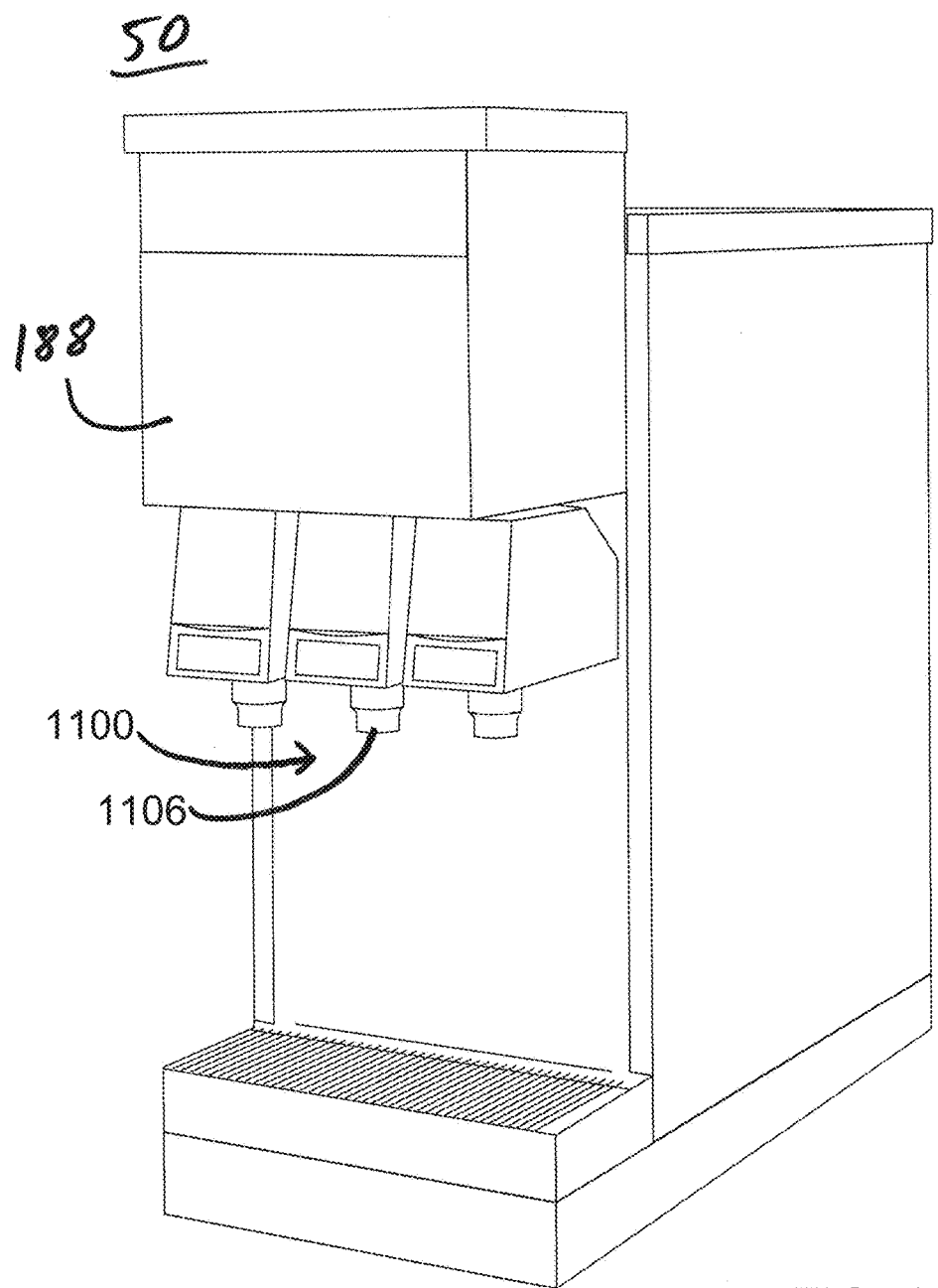
FIG. 12A is a perspective drawing of a beverage dispenser cleaning apparatus in accordance with an exemplary embodiment of the present invention.

In a food service setting, and as shown in FIG. 12A, dispenser unit 50 includes a cleaning apparatus for cleaning nozzles 1106. The cleaning apparatus is not visible in FIG. 1A because it is in a storage position. In particular, FIG. 12A illustrates exemplary doors 188 which may be in a closed position when the cleaning apparatus is not in use. In order to clean nozzles 1106, doors 188 and the cleaning apparatus is moved into a position for cleaning nozzles 1106 as is more clearly described below. The inclusion of doors 188 is optional.

Dispenser unit 50 dispenses beverages by placing a container under the respective nozzle 1106 of a dispenser from which a beverage is desired. In some food service settings, dispenser unit 50 is only available to employees. In that setting, customers tell an employee which beverages they desire and the employee obtains the beverage from the appropriate dispenser 1100. In other food service settings, the beverages are considered "self-serve" and a customer may directly use dispenser unit 50 in order to obtain a desired beverage.

In the configuration shown in FIG. 12B, doors 188 have been opened and arm 1200 is shown in a first position. This position shown may be considered to be a storage position, namely, this is the position that arm 1200 may be placed into when dispenser unit 50 is being used for dispensing beverages, doors 188 are normally closed and cleaning of nozzles 1106 is not desired. As shown, arm 1200 includes first arm member 1202 and second arm member 1204 which is substantially perpendicular to first arm member 1202. Cleaning nozzle 1206 is shown near an end of second arm member 1204. Supply tube 1218 is also included. Supply tube 1218 supplies a cleaning fluid to cleaning nozzle 1206. First arm member 1202 and second arm member 1204 appear rigid in the figures, but in an exemplary embodiment of the present invention first arm member 1202 and/or second arm member 1204 are telescoping so that they may be stored in compacted form.

In the position shown in FIG. 12B, arm 1200 is being stored because it is not being used. Arm 1200 includes, however, hinge 1208 at an end thereof. Hinge 1208 allows arm 1202 to rotate so that cleaning nozzle 1206 may be situated directly under dispenser nozzle 1106.

Again, doors 188 are illustrated in an open position, although they are ordinarily closed when arm 1200 is in the position shown in FIG. 12B. When arm 1200 is in the illustrated first position, it may be desirable for arm 1200 to not be visible to a person using dispenser unit 50. Preventing arm 1200 from being visible when in the first position may be desirable for aesthetic purposes. Furthermore, in the first position, supply tube 1218 is not supplying fluid to cleaning nozzle 1206.

In order for each nozzle 1106 to be cleaned, arm 1200 is desirably rotated so that cleaning nozzle 1206 is under dispenser nozzle 1106. Rotation of arm 1200 occurs by moving arm 1200 through a variety of different positions until it is in a position that is desirable for dispenser nozzle 1106 to be cleaned.

As further explained below, the angle at which arm 1200 appears in FIG. 12B is merely exemplary. For example, arm 1200 can be stored in a variety of different positions so that arm 1200 is not obstructing nozzles 1106 while nozzles 1106 are being used to dispense beverages.

Figure 12C:
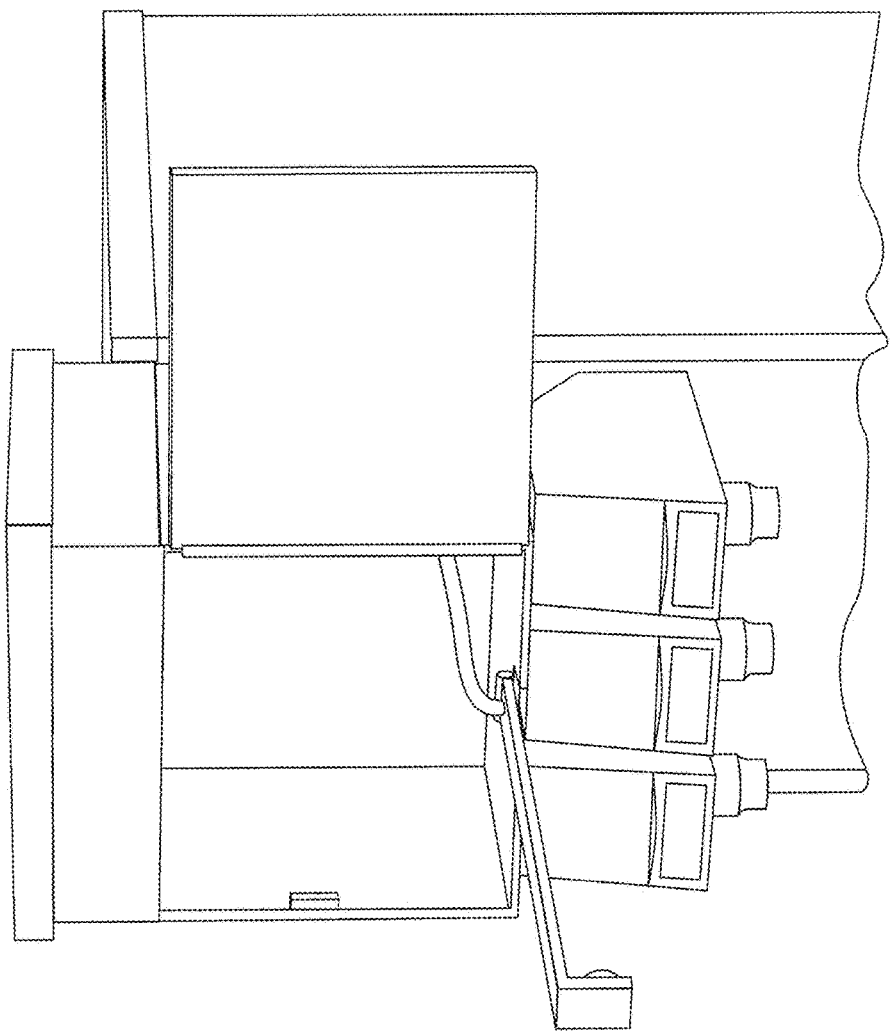
FIG. 12C is a perspective drawing of a beverage dispenser cleaning apparatus in accordance with the further exemplary embodiment of the present invention.

In FIG. 12C, rotation of arm 1200 has already begun so that arm 1200 has now been rotated approximately 90° relative to the position in which it appears in FIG. 12B. In the second position shown in FIG. 12C, supply tube 1218 is still not providing fluid to cleaning nozzle 1206.

Arm 1200 continues to be rotated until it is in the $3^{rd}$ position shown in FIG. 12D. As shown in FIG. 12D, arm 1200 is resting along the front of dispenser 1100. As a result of being in the position illustrated in FIG. 12D, cleaning nozzle 1206 is now directly under dispenser nozzle 1106. In this manner, supply tube 1218 can then provide fluid to cleaning nozzle 1206 so that fluid can flow out of cleaning nozzle 1206 and into dispenser nozzle 1106. Also, in this position, if first arm member 1202 and second arm member 1204 telescope, these arm members would telescope for the position shown in FIG. 12D. Specifics of how fluid is provided through supply tube 1218 and through cleaning nozzle 1206 so that dispenser nozzle 1106 may be cleaned is more clearly described below.

Figure 12E:
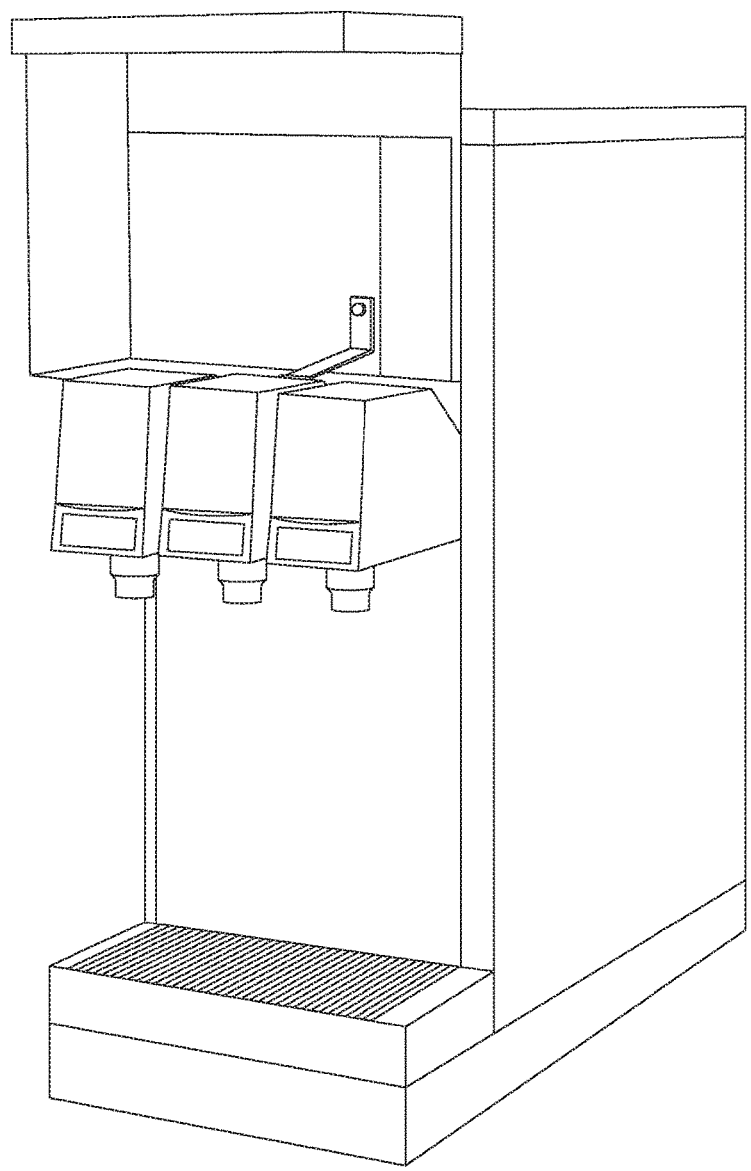
FIG. 12E is a perspective drawing of a beverage dispenser cleaning apparatus in accordance with another exemplary embodiment of the present invention, namely an optional position prior to the first position illustrated in FIG. 12B.

The first position shown in FIG. 12B is exemplary and it is understood that arm 1200 may be stored in other configurations than what is illustrated in FIG. 12A. For example, in FIG. 12E, arm 1200 has been rotated approximately 90° from the orientation shown in FIG. 12B and in the opposite direction as the orientation shown in FIG. 12C. Thus, the orientation of arm 1200 that appears in FIG. 12E is both exemplary, and optional.

Figure 1:
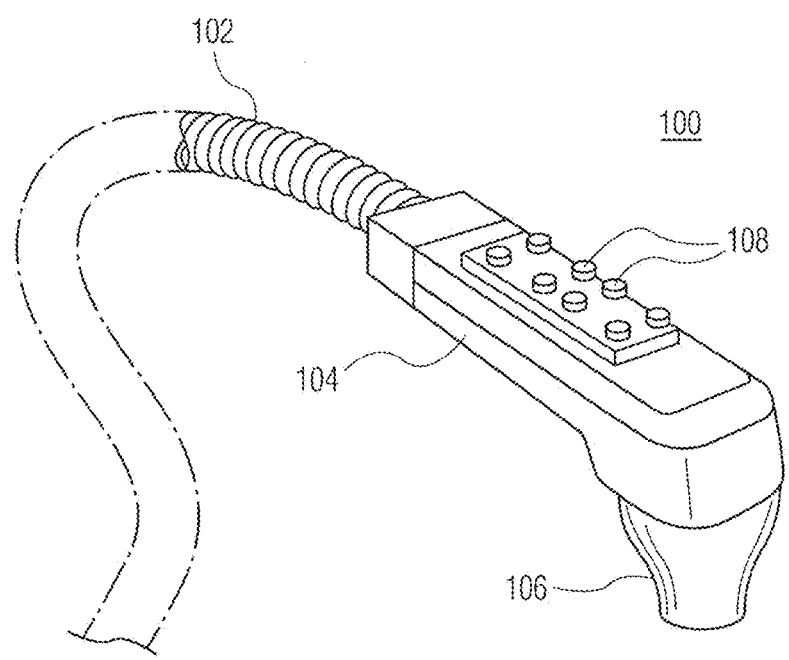
FIG. 1 is a perspective drawing of a prior art beverage dispenser.
Figure 13C:
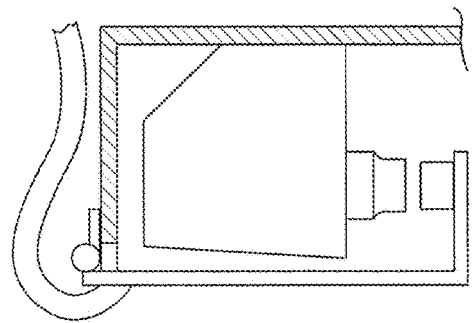
FIG. 13C is a side view that corresponds to the cleaning apparatus position illustrated in FIG. 12D.
Figure 13B:
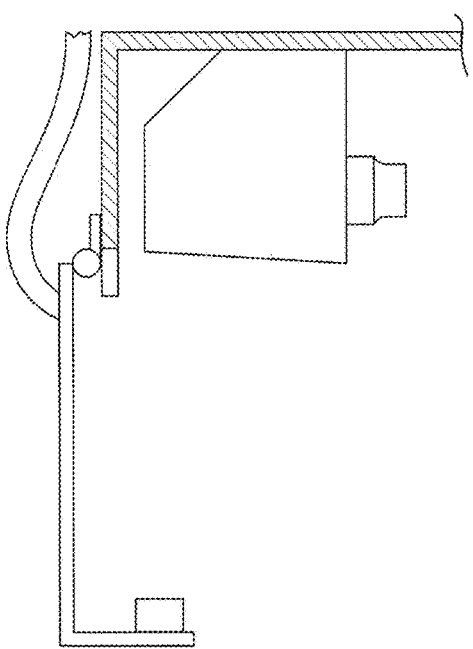
FIG. 13B is a side view that corresponds to the cleaning apparatus position illustrated in FIG. 12C.
Figure 13A:
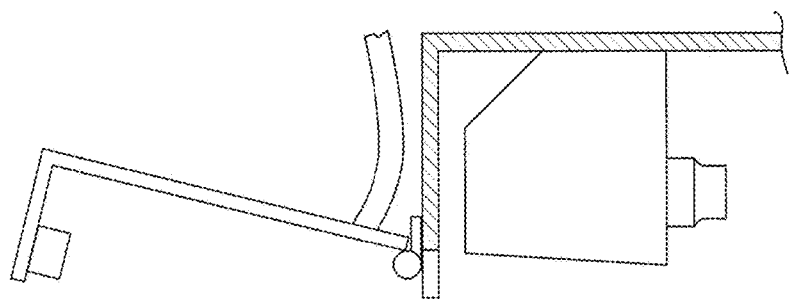
FIG. 13A is a side view that corresponds to the cleaning apparatus position illustrated in FIG. 12B.

FIG. 13A is a side view of the orientation of armed 200 that is illustrated in FIG. 1B. As shown in FIG. 13A, first arm member 1202 is extending substantially vertically upwards relative to dispenser 1106. Furthermore, supply tube 1218 is again shown. As previously explained, fluid is caused to flow through cleaning nozzle 1206 as a result of being transported to cleaning nozzle 1206 via supply tube 1218. Furthermore, in one exemplary embodiment of the present invention, supply tube 1218 is attached to arm 1200 beginning at a location near hinge 1208 and extending to dispenser nozzle 106. In this manner, as arm 1200 rotates into various positions, supply tube 1218 is able to rotate along with arm 1200.

FIG. 13B illustrates arm 1200 from a side view and in the position that is illustrated in FIG. 1C.

FIG. 13C is a side view of arm 1200 as illustrated in FIG. 1D. FIG. 13C further illustrates how in the third position, arm 1200 positions cleaning nozzle 1206 so that cleaning nozzle 1206 is directly under dispenser nozzle 1106. This configuration is desirable for cleaning dispenser nozzle 1106 as more clearly described below.

In actual operation, arm 1200 is stored in, for example, the $1^{st}$ position, and behind doors 188 when dispenser unit 50 is being used for dispensing beverages. Typically, however, there are certain times of the day when dispenser unit 50 is not dispensing beverages. For example, dispenser unit 50 may not be dispensing beverages after the food establishments in which dispenser unit 50 has been closed for the day. At that time, since dispensers 1100 will not be dispensing beverages, nozzles 1106 are desirably cleaned. In one exemplary embodiment of the present invention, optional doors 188 are opened and arm 1200 is rotated until it is in the position shown in FIG. 12D and FIG. 13C. Fluid may then be sprayed upwards from cleaning nozzle 1206 into dispenser nozzle 1106. Spraying of fluid upwards into dispenser nozzle 1106 may be performed in a variety of different manners. In one exemplary embodiment, a timer is used so that fluid is sprayed from cleaning nozzle 1206 into dispenser nozzle 1106 at a predetermined time of the day or night (i.e. when the food establishment is closed). In another exemplary embodiment, a switch is located on or near dispenser unit 50 and activation of that switch causes fluid to be sprayed from cleaning nozzle 1206 to dispenser nozzle 1106. In a further exemplary embodiment of the present invention, fluid flows through cleaning nozzle 1206 and into dispenser nozzle 106 using both the timer and an activation switch. Thus, if employees forget to lower arm 1200 into the third position shown in FIG. 1D prior to the time that a timer causes fluid to flow through cleaning nozzle 1206, an employee may manually actuate the activation switch after lowering arm 1200 into the third position at a later time.

In accordance with a further exemplary embodiment of the present invention, and as shown in FIG. 14, the cleaning nozzle may be surrounded by a ring member to catch cleaning solution and prevent splashing as cleaning solution falls towards the beverage dispenser's drip tray.

In accordance with a further exemplary embodiment of the present invention, an interlocking mechanism is included to ensure that arm 1200 is in the third position before fluid is permitted to flow out of cleaning nozzle 1206. In this manner, for example, if employees forget to lower arm 1200 into the $3^{rd}$ position, fluid will not be permitted to flow out of cleaning nozzle 206 while, for example, arm 1200 is in the first position or the second position. The interlocking mechanism can have a variety of different configurations as is known to one of ordinary skill me art. For example, the interlocking mechanism can be a switch that is actuated after arm 1200 is placed into the third position. Such a switch can be included within hinge 1208, situated behind arm 200 when arm 1200 is in the first position, etc.

Figure 15:
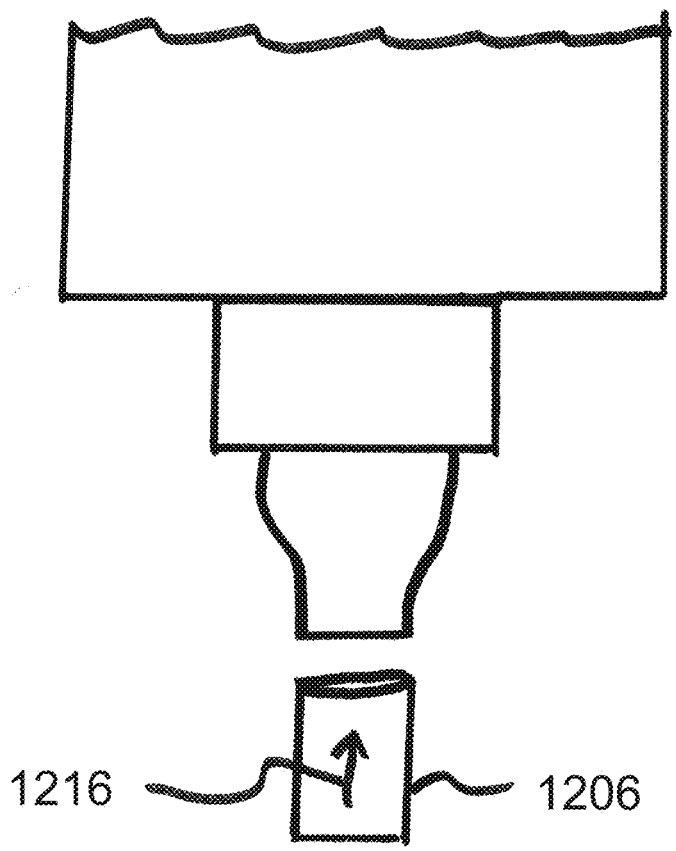
FIG. 15 is a front view that illustrates the orientation between a beverage dispenser nozzle and a cleaning nozzle in accordance with an exemplary embodiment of the present invention.

In the third position, arm 1200 is oriented so that cleaning nozzle 1206 is directly below dispenser nozzle 106. This configuration is shown, for example, in FIG. 15. The direction of the fluid stream 1216 is also shown in FIG. 15. In the configuration shown in FIG. 15, fluid is provided to clean nozzle 1206, and that fluid is subsequently sprayed up into dispenser nozzle 1106 so that dispenser nozzle 1106 may be cleaned.

Dispenser unit 50 desirably includes a drip tray which catches drippings that flow from dispensers 1100. The drip tray may also be used for catching fluid after it has been sprayed into nozzle's 1106.

In many restaurants, dispenser unit 50 includes more than one dispenser 1100. Many restaurants have dispenser unit 50 with multiple dispensers 1100 in order to accommodate the number of customers who wish to be served beverages and the variety of different beverages that customers desire. FIG. 4 illustrates that valve outlets 312a-312b provide pressurized fluid to each inlet 206a-206b respectively. Valve outlets 312a-312b are described in detail below.

Figure 16:
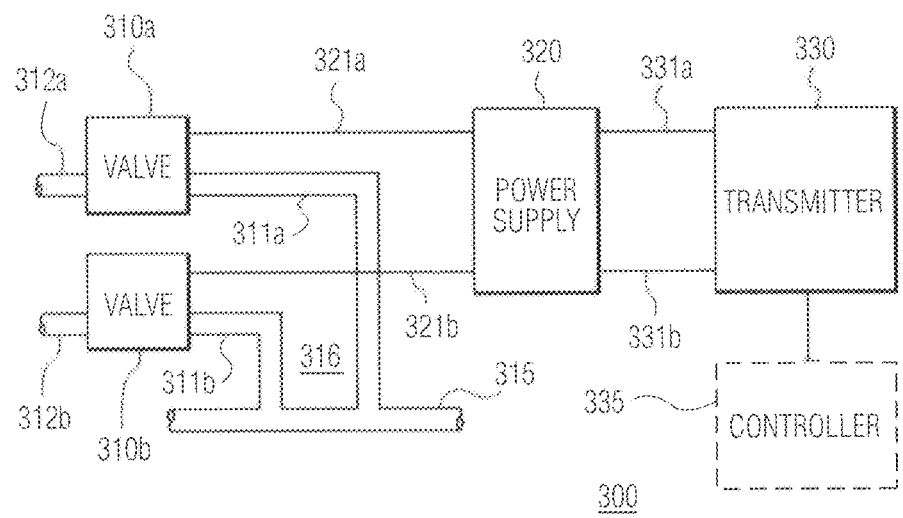
FIG. 16 is a block diagram which illustrates a cleaning apparatus for cleaning one or more beverage dispensers in accordance with an exemplary embodiment of the present invention.

FIG. 16 is a block diagram of cleaning apparatus 300 which, in accordance with an exemplary embodiment of the present invention, provides fluid to each cleaning nozzle 1206. Cleaning apparatus 300 illustrated in FIG. 16 thus provides fluid under pressure which is received by cleaning nozzle 1206 and which is then propelled upwards towards dispenser nozzle 1106 in order to clean dispenser nozzle 1106.

Cleaning apparatus 300 shown in FIG. 16 is controlled by transmitter 330. Transmitter 330 allows fluid to be directed into inlet 106 at one or more specified times. Transmitter 330 may receive instructions from microprocessor based controller 335 which is programmed to instruct transmitter 330 to signal power supply 320. In an exemplary embodiment of the present invention, controller 335 is a DirectLOGIC Micro Programmable Logic Controller (DL05 PLC) which is manufactured by AutomationDirect. This programmable logic controller (PLC) is programmed in accordance with the DL05 Micro PLC User Manual, volumes 1 and 2, $6^{th}$ Edition, Rev. C, February 2013 which is hereby incorporated by reference in its entirety. Transmitter 330 via controller 335 is used to control valves 310a, 310b which permit fluid to flow into inlets 1206 of respective holsters 1200, thus cleaning respective nozzles 1206. Thus, controller 335 has stored therein the current clock time (controller 335 increments the current clock time as time progresses so that the current clock time stored in controller 330 is correct). Basically, when the current clock time stored in controller 330 reaches a predetermined time, controller 330 instructs valves 310a,b to open, thus causing fluid to flow into cleaning nozzles 1206. After a predetermined period of time has elapsed, controller 335 instructs valves 310a,b to close, thus causing fluid to cease flowing into cleaning nozzle 1206. Controller 335 then waits until the next time that valves 310a,b are to be opened, and then repeats the cycle of opening and closing valves 310a,b.

Controller 335 instructs valves 310a,b to open and close via power supply 320. In an exemplary embodiment of the present invention, power supply 320 is a PS-6012 manufactured by Altech Corp. and is installed and operated in accordance with the Altech Corp. PS-60 data sheet which is hereby incorporated by reference.

Controller 335 signals power supply 320 via controller outputs 331a,b. Power supply 320 subsequently provides 12 volt signals to valves 310a, b responsive to being signaled by outputs 331a,b respectively. Thus, a positive signal on controller output 331a causes power supply 320 to transmit a 12 volt signal on power supply output 321a. Furthermore, a positive signal on controller output 331b causes power supply 320 to transmit a 12 volt signal on power supply output 321b. When the positive signal is removed from controller output 331a, output 321a ceases to provide a 12 volt signal. When the positive signal is removed from controller output 331b, output 321b ceases to provide a 12 volt signal.

Valves 310a, b are valves which regulate flow of liquid. In an exemplary embodiment of the present invention, valves 310a, b are 12 VDC solenoid valves (i.e. valves with 12 volt relays) plastic ½" manufactured by Zilong. When valves 310a,b receive 12 volt signals on their respective control inputs, the valves open and fluid provided at the valves' input is allowed to flow out the valves' output. When the 12 volt signals are removed from each valves' control inputs, the valves close and fluid is not permitted to flow out of each valves' output. A desirable flow rate for the output of each valve is, for example, 1 gallon per minute.

Thus, power supply outputs 321a,b are connected between power supply 320 and valves 310a, b. When power supply 320 places a 12 volt signal on power supply output 321a, valve 310a opens. When power supply 320 places a 12 volt signal on power supply output 321b, valve 310b opens. When the respective 12 volt signals are removed from each respective power supply output, the respective valve closes.

Valves 310a,b receive fluid via valve inlets 311a,b respectively. Valve inlets may be pipes or tubes (e.g. flexible tubes) having, for example, a diameter of ⅜". Valve inlets 311a,b receive fluid via pressurized fluid source 315. Pressurized fluid source 315 includes branch 316 which directs fluid under pressure to valve inlets 311a,b. Thus, when valve 310a opens, fluid from valve inlet 311a is permitted to flow through valve outlet 312a. Furthermore, when valve 310b opens, fluid from valve inlet 311b is permitted to flow through valve outlet 312b. Valve outlet 312a is connected to inlet 206a and valve outlet 312b is connected to inlet 206b. Thus, when valves 310a,b open, fluid is directed to holsters 200 in order to clean nozzles 106.

Pressurized fluid source 315 delivers pressurized fluid from a pressurized fluid source. The pressurized fluid source can be, for example, pressurized water from a municipal water source. Alternatively, the pressurized fluid source can be otherwise. For example, FIG. 5A illustrates an exemplary embodiment of the present invention in which fluid is stored in tank 410. Pump 414 pumps fluid out of tank 410 via supply tube 412 and into pressurized fluid source 315. Pump 414 may be actuated by controller 335 (via power supply 320). Pump 414 should have sufficient power (suction) to pump fluid out of tank 410 to holster(s) 200. In an exemplary embodiment of the present invention, pump 414 is a PM300 Perimax pump manufactured by Simply Pumps.

The fluid used to clean nozzle 106 may be for example a fluid which is safe for human consumption. Thus, a food grade solution is desirable as the fluid to be stored in tank 410. Exemplary food grade solutions include chlorine bleach (diluted 1 teaspoon to 1 quart of water, hydrogen peroxide (3%), and white distilled vinegar (5%). Other liquids may be used as the fluid within tank 410. Exemplary fluids which may be used within tank 410 include, for example: a) citric acid (with an exemplary concentration of between 2.5% and 35%) b) lactic acid (with an exemplary concentration of between 2.5% and 60%); and c) peracetic acid (with an exemplary concentration of between 1% and 22%). Other food sanitizing surface agents may also be used, including Steramine. Water may also constitute a "fluid." Furthermore, fluid source 315 may optionally include a y-junction 420 and valves 416, 418 which allows the fluid flowing into pressurized fluid source 315 to alternate between the fluid stored in tank 410 and water obtained from a commercial water supply 430. Controller 335 can thus allow solution from tank 410 to clean nozzle(s) 106 for a first amount of time (by actuating valve 416), and to then allow water from a commercial water source to clean nozzle 106 for a second amount of time (by actuating valve 418).

In a further alternative embodiment of the present invention, tank 410 is eliminated and all cleaning is done simply using fluid from water source 430. Water source 430, may be, for example, a municipal water source. If the municipal water source is supplying water with sufficient pressure, then the pressure provided by the municipal water source may be sufficient to clean nozzle 106.

In a further exemplary embodiment of the present invention, an additional pump 435 is used with the water from water source 430 in order to increase the pressure of water being received from water source 430. Pump 435 may be used, for example, on demand. Thus, for example, a water pressure of 40 PSI from water source 430 may be desirable to clean nozzle 106. Pump 435 may be omitted if the water pressure from water source 430 is approximately 40 PSI or higher, Pump 435 may be included if the water pressure from water source 430 is below 40 PSI. If pump 435 is operated on an on demand basis, the pump 435 is activated if water pressure from water source 430 is below 40 PSI and pump 435 is deactivated (allowing water to pass through without boosting water pressure) if water pressure from water source 430 is 40 PSI or greater. A water pressure of 40 PSI is merely exemplary, and it is understood that a water pressure at which operation of pump 435 is desirable may be higher or lower depending upon individual circumstances.

In a further embodiment of the present invention, pump 435 may be used in combination with a fluid pressure detection switch. Thus, for example, if water pressure from the water source drops below a predetermined limit (e.g. 24 PSI) then the fluid pressure switch detects the lower pressure and activates the pump automatically. Thus, fluid is sprayed towards nozzle 106 without a pump assist if fluid pressure from the fluid source is above 24 PSI (for example) and fluid is sprayed towards nozzle 106 with a pump assist if fluid pressure from the fluid source is below 24 PSI (for example).

Figure 17A:
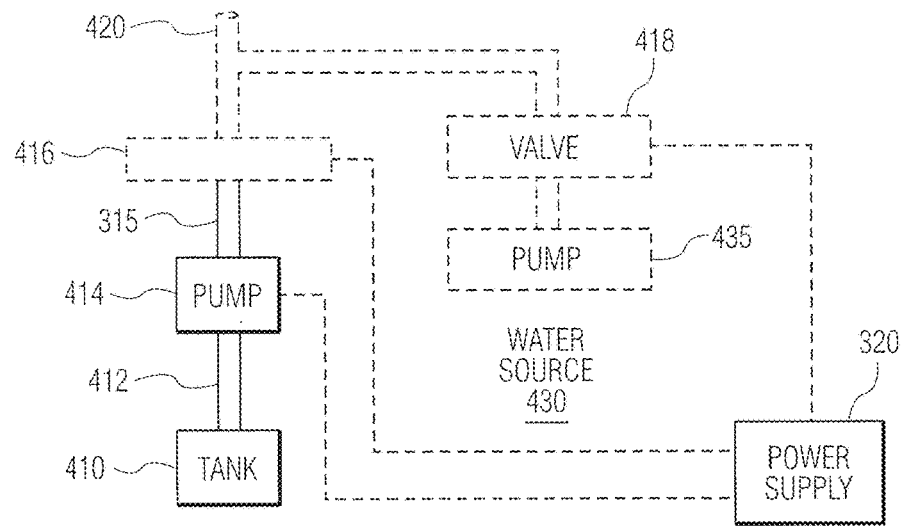
FIG. 17A is a block diagram which illustrates a portion of a system which delivers a cleaning solution that is used to clean one or more beverage dispensers in accordance with an exemplary embodiment of the present invention.

FIG. 16 and FIG. 17A illustrate various exemplary valves 310a, 310b and 418. One or ordinary skill in the art, however, may replace all of the various valves with a single valve (and/or a single source of fluid pressure). Thus, when the single valve is open (and/or fluid pressure is available), fluid is sprayed to all nozzles 1106. When the single valve is closed (and/or fluid pressure is not available), fluid is not sprayed to all nozzles 1106 (or to no nozzles 1106). Exemplary locations to place a single valve include just prior to branch 316, or at a point downstream from pump 414 (if pump 414 is included) or pump 435 (if pump 435 is included).

Figure 17B:
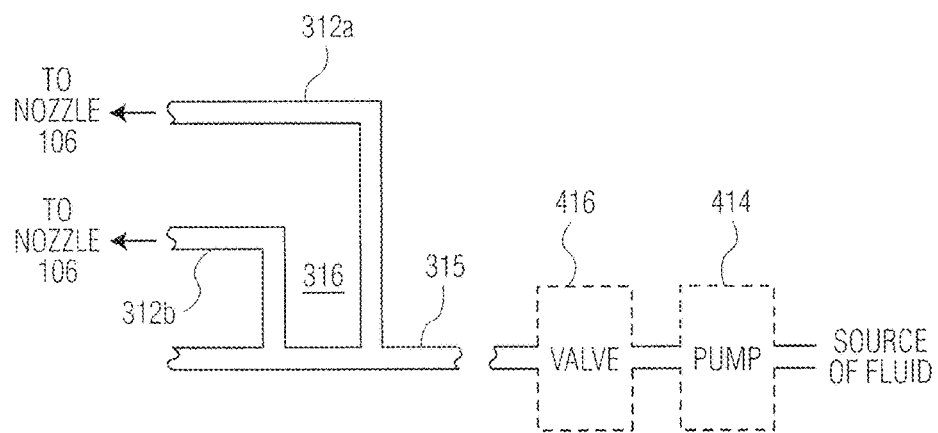
FIG. 17B is a block diagram which illustrates a portion of a system which delivers a cleaning solution that is used to clean one or more beverage dispensers in accordance with a further exemplary embodiment of the present invention.

FIG. 17B illustrates an alternative embodiment of the present invention. As shown, fluid is directed under pressure to different nozzles 1106 of respectively different dispensers 1100. Fluid arrives under pressure via pressurized fluid source 315 and is directed to valve outlets 312a,b via branch 316. There are several ways that fluid under pressure is provided to pressurized fluid source 315:

- Pump 414 and valve 416 may be provided. Fluid from a source of fluid pumped with pressure via pump 414 to valve 416. When valve 416 is open, fluid under pressure arrives at pressurized fluid source 315. When valve 416 is closed, fluid is prevented from arriving at pressurized fluid source 315. Valve 416 and pump 414 can be controlled by controller 335 and power supply 320 as described above.

- Pump 414 may be provided and valve 416 may be omitted. When pump 414 is on, fluid from a source of fluid is pumped with pressure via pump 414 to pressurized fluid source 315. When pump 414 is off, fluid from a source of fluid (not under pressure) is prevented from arriving at pressurized fluid source 315. Pump 414 can be controlled by controller 335 and power supply 320 as described above.

- Valve 416 may be provided and pump 414 may be omitted. This embodiment may be used if the source of fluid is providing fluid to valve 416 under pressure. Fluid may be provided under pressure if the source of fluid is, for example, a municipal water supply. As previously explained, it is desirable for the amount of pressure in the fluid transmitted to pressurized fluid source to be sufficient to clean residue off of nozzles 106. Thus, when valve 416 is open, fluid from a source of fluid flows to pressurized fluid source 315. When valve 416 is closed, fluid from a source of fluid is prevented from arriving at pressurized fluid source 315.

Each of the above alternative embodiments enables pressurized fluid from a single source to arrive at pressurized fluid source 315, to flow through branch 316, and to then be sprayed onto multiple nozzles 106 via valve outlets 312a,b.

Figure 18:
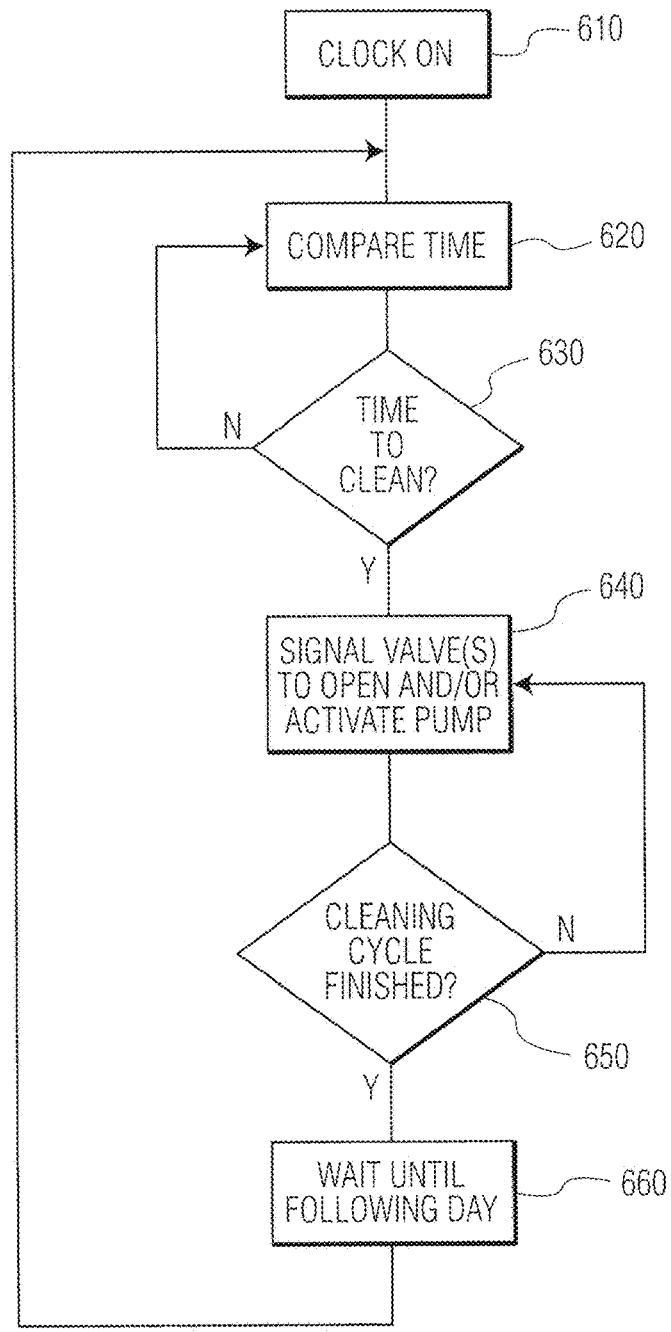
FIG. 18 is flowchart diagram which illustrates an algorithm which is used to clean one or more beverage dispensers in accordance with an exemplary embodiment of the present invention.
Figure 19:
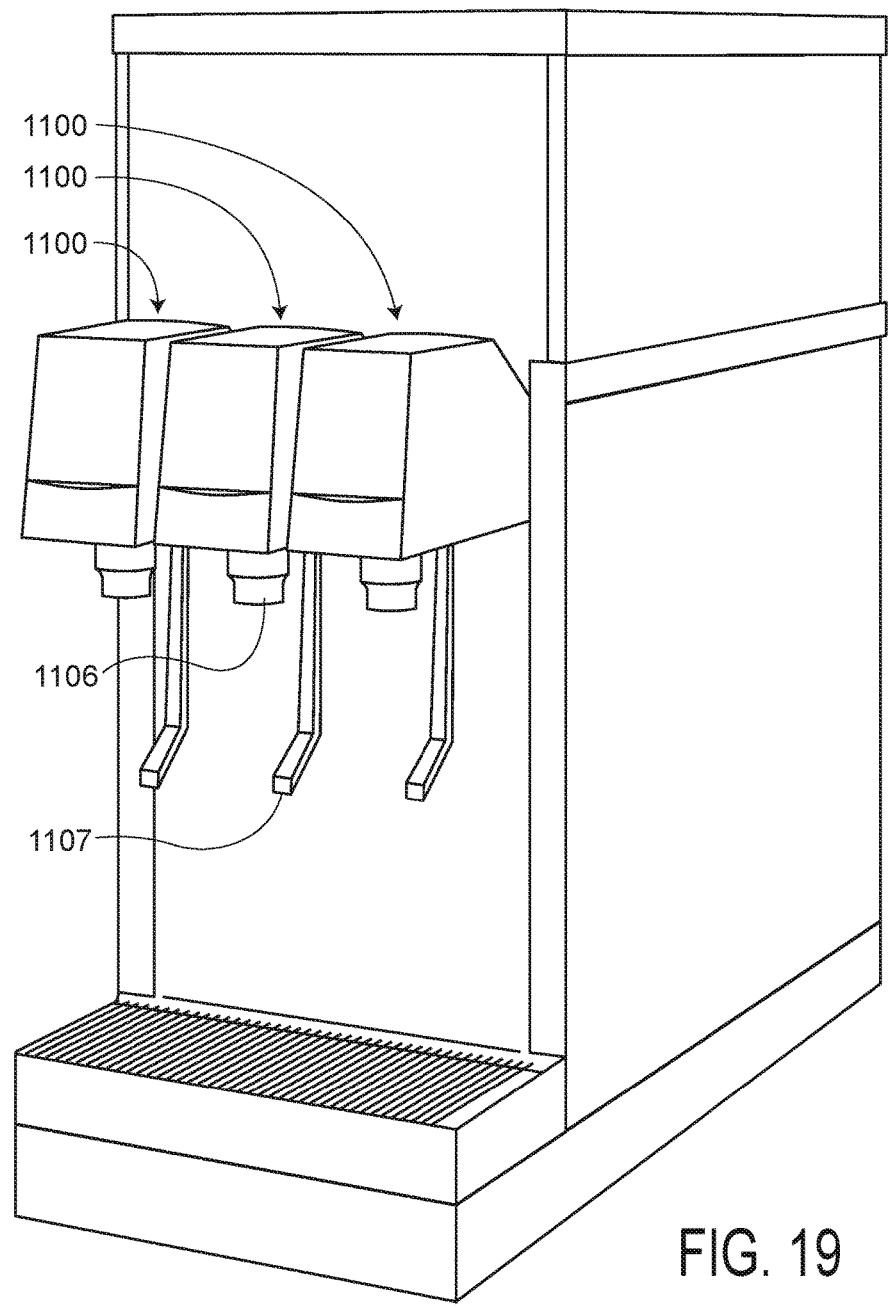
FIG. 19 is a perspective drawing of a prior art beverage dispenser.

FIG. 18 is a flow chart diagram which illustrates an algorithm which may be used by controller 335 in accordance with an exemplary embodiment of the present invention. At step 610 a clock is activated with a time (e.g. the current time). At 620, the time from the clock activated at step 610 is compared with a prestored time. If, at step 630 the clock and the prestored time are the same, then at step 640 controller 335 signals for valves 310a,b to open so that fluid flows through valve outlets 312a,b and nozzle(s) 106 can be cleaned. The valves are signaled to remain open until, at step 650, enough time has passed that nozzle(s) 106 are clean. In an exemplary embodiment of the present invention, the valves are opened once a day for 30 seconds. One of ordinary skill in the art, however, will understand that the valves can be opened more than once per day and for more than 30 seconds. At step 660, processing waits until the following day. Processing then proceeds to step 620 where the loop is repeated.

In accordance with an exemplary embodiment of the present invention, it is desirable to allow fluid to be sprayed out of valve outlets 312a,b at predetermined times. Thus, when a predetermined time is reached (e.g. 4 AM, 8 AM etc.) valves 310a,b are opened and pressurized fluid flows out of valve outlets 312a,b and towards nozzle 106. The predetermined time may be chosen based upon times that beverages are typically not being served from dispenser 100 (such as a when a bar or restaurant is closed). At such times, nozzles 106 are resting in holsters 200 as they are not being used.

In an exemplary embodiment of the present invention, in order to ensure that sufficient pressure is delivered to each nozzle 102, valves 310a, b can be opened sequentially instead of at the same time. Thus, valve 310a can be opened, kept open, and closed before valve 310b is opened, kept open and closed.

While the above exemplary embodiment illustrates controller 335, it is understood that controller 335 can be replaced with other methods and apparatus for controlling cleaning apparatus 300.

For example, controller 335 can be located at a remote site and can communicate with transmitter 330 via a Wi-Fi connection. Thus, a Wi-Fi receiver can receive signals over a wireless connection and can then signal power supply 320 to open and close valves in order to perform nozzle cleaning. It is understood that other forms of communication (wired and wireless) may also be used.

In actual practice, it is desirable for power supply 320 and controller 335 (or a Wi-Fi receiver if power supply 320 is controlled remotely) to be mounted in a box, such as a box with a screw on panel, in order to protect power supply 320 and controller 335 from tampering. Valves 310a and 310b can be mounted, for example, next to such a box and near tank 410 and/or a commercial water supply. The box and valves 310a,b can be located away from the bar area in order to avoid unnecessary crowding of the bar area. Valve outlets 312a,b can be routed through walls and/or floors to be connected to inlet 206. In this manner, power supply 320 and controller 335 can be placed in a desirable location in order to clean a plurality of dispensers 100 located in respectively different physical locations.

In an alternative embodiment of the present invention, the fluid that is flowing through valve outlets 312a,b can be heated. In this manner, effectiveness of the fluid in disinfecting nozzle 106 can be enhanced. A fluid heating mechanism (for example an instant hot water dispenser manufactured by InSinkErator) can be used to heat fluid before it reaches nozzle 106.

Exemplary locations to place an instant hot water dispenser include along valve outlets 312a,b, valve inlets 311a,b, or anywhere before or after valve 416 and/or valve 418.

FIGS. 12B-12E and 13A-13C illustrate only one arm 1200, however it is understood that a separate arm may be available to clean each beverage dispenser, respectively. Furthermore, it is possible that each arm is separately actuated to pivot and assume a position so that each cleaning nozzle is under a respective beverage nozzle. Alternatively, each arm can be coupled to a neighboring arm so that all arms pivot into position together when any of the individual arms are rotated into position.

The above description and illustrations show fluid flowing into two valve outlets 312a,b via branch 316. It is understood, that the description of two valve outlets is merely exemplary, and the actual number of valve outlets may be two or greater. In this manner, two or more cleaning nozzles 206 of respective arms 200 can be included in accordance with the exemplary embodiments set forth above.

The above description describes opening valves and/or engaging a pump for a certain amount of time in order to clean nozzles 1106. One or ordinary skill in the art will recognize that there are methods for determining how much cleaning fluid is sprayed on each nozzle 1106. For example, instead of measuring the amount of time fluid is being sprayed onto nozzles 1106, one can spray cleaning fluid onto nozzles 1106 based on the amount of cleaning fluid being sprayed. Thus, for example, a dosing pump can be used to deliver a certain amount of cleaning fluid to nozzles 1106. Permitting and then stopping cleaning fluid from spraying onto nozzles 1106 can thus be a function of the amount of cleaning fluid sprayed, the amount of time during which cleaning fluid is sprayed, or both.

In a further exemplary embodiment of the present invention, an additional tube is directed towards the drain at which holster 1200 drains. This additional tube can direct a sanitizing solution towards the drain to prevent fruit flies from accumulating near the drain. The sanitizing solution can be permitted to flow into the drain by use of the controller described above, and this sanitizing solution can be permitted to flow into the drain at a predetermined time of day.

In a further exemplary embodiment of the present invention, an electronic memory stores a record of when cleaning fluid is permitted to flow towards nozzle 106 (and optionally for how long). In this manner, a record is maintained to ensure compliance with a regular cleaning schedule.

The method and apparatus described above provides numerous advantages over the prior art:

The apparatus described above is attached to arm 1200 using tubes. Therefore, the controller, power supply and valves can be located at a location away from dispenser unit 50. Thus, for example, controller 335 and power supply 320 may be located in a place which is away from customers and/or away from directly behind a bar. Controller 335 and power supply 320 can be housed in a "Bud" box and valves 310a,b can be located near the "Bud" box. Valve outlets 312a,b can be comprised of many feet of tubing. The tubing can be hidden under a bar counter and the tubing can extend to each dispenser 1100. In this manner, multiple nozzles 1106 can be cleaned without placing the equipment needed to clean nozzles 1106 in inconvenient locations where a bar tender is attempting to work. The length of the tubing may determine the amount of power desirable in pump 414 to be able to pump fluid to each cleaning nozzle 1206 to clean each dispenser nozzle 1106.

By streaming fluid at nozzles 1106 when the bar or restaurant is closed, it is unnecessary to clean nozzles 1106 after each use. When the bar or restaurant is closed and nozzles 1106 are not being used, fluid can be directed to nozzles 1106 for an extended period of time without interfering with a bartenders need to use the dispenser, especially during a busy time in the bar or restaurant.

The examples that are illustrated show exemplary embodiments of the present invention being used in combination with a beverage dispenser that dispenses by pushing pushbuttons on a front thereof. It is understood, however, that the beverage dispenser may dispense using other structure and methods, such as mechanical arms that pushed by cup as the cup is positioned under the nozzles, sensors that detect when a cup has been positioned under a dispenser, etc.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

Apparatus for cleaning a plurality of beverage dispensers, said apparatus comprising:
a) a plurality of cleaning solution conduits which are oriented to spray cleaning solution towards respective beverage dispensers;

b) at least one of a fluid valve and pump which alternatively permits and does not permit said cleaning solution to flow to said plurality of cleaning solution conduits, respectively;

c) a power supply which supplies one or more flow signal to said at least one of said fluid valve and said pump, wherein said valve transitions between permitting and not permitting flow responsive to transitioning of said flow signal, respectively;

d) a transmitter which signals said power supply to transition said flow signal to cause said at least one of said fluid valve and said pump to permit said cleaning solution to flow from a common source of said cleaning solution to said plurality of cleaning solution conduits.

2. Apparatus according to claim 1, further comprising a microprocessor based controller which signals via said transmitter to transition said one or more flow signals to cause said fluid valve to permit said cleaning solution to flow to said plurality of cleaning solution conduits, wherein signaling by said microprocessor based controller permits said cleaning solution to flow occurs for a predetermined duration.

3. Apparatus according to claim 1, wherein said cleaning solution is prevented from recirculating through said cleaning solution conduits after leaving said dispensers.

4. Apparatus according to claim 1, further comprising drain lines that direct the cleaning solution leaving said beverage dispensers into a public drain.

5. Apparatus according to claim 2, wherein said controller controls each of said fluid valves independently.

6. Apparatus according to claim 1, wherein said fluid valves receive said cleaning solution from a common source.

7. Apparatus according to claim 1, further comprising a tank for storing said cleaning solution and a pump for pumping said cleaning solution from said tank to said plurality of fluid valves.

8. Apparatus according to claim 1, further comprising a supply tube for transporting said cleaning solution, a splitter for splitting said supply tube into a plurality of sub-tubes, wherein each of said plurality of sub-tubes transports said cleaning solution to a respective one of said fluid valves.

9. Apparatus according to claim 1, wherein said cleaning solution conduits direct said fluid towards respective centers of said opening from a stationary location.

10. A method of cleaning a plurality of beverage dispensers which sit in respective holsters, said method comprising the steps of:
    a) spraying cleaning solution towards respective beverage dispensers;
    b) alternatively permitting and not permitting said cleaning solution to flow to said cleaning solution conduits from a common source and with pressure;
    c) supplying flow signals to at least one of a fluid valve and said pump, wherein said at least one of said fluid valve and said pump transitions between permitting and not permitting flow responsive to transitioning of said flow signal;
    d) signaling said power supply to transition said flow signal to cause said at least one of said fluid valve and said pump to permit said cleaning solution to flow from said common source of said cleaning solution to said cleaning solution conduits.

11. A method according to claim 10, wherein a microprocessor based controller signals to transition said flow signals to cause said fluid valves to permit said cleaning solution to flow to said cleaning solution conduits, wherein signaling by said microprocessor based controller, wherein signaling to permit said cleaning solution to flow occurs at a predetermined time of day and for a predetermined duration.

12. A method according to claim 10, wherein said cleaning solution is prevented from recirculating through said cleaning solution conduits after leaving said beverage dispensers.

13. A method according to claim 10, wherein drain lines direct the cleaning solution leaving said dispensers into a public drain.

14. A method according to claim 10, wherein said controller controls each of said fluid valves independently.

15. A method according to claim 10, wherein said fluid valves receive said cleaning solution from a common source.

16. A method according to claim 10, wherein a tank stores said cleaning solution and a pump for pumping said cleaning solution from said tank to said plurality of fluid valves.

17. A method according to claim 10, wherein a supply tube transports said cleaning solution, a splitter splits said supply tube into a plurality of sub-tubes, and each of said sub-tubes transports said cleaning solution to a respective one of said fluid valves.

18. A method according to claim 10, wherein said cleaning fluid is directed towards respective centers of said opening from a stationary location.

19. A method according to claim 10, wherein said cleaning solution is selected from the group consisting of: a) citric acid; b) lactic acid; and c) peracetic acid.

20. A method according to claim 11, wherein said cleaning solution is heated.

21. Apparatus for cleaning a plurality of beverage dispensers, said apparatus comprising:
    a) an arm that swings a cleaning nozzle into a position pointing towards a nozzle of said beverage dispensers;
    b) a fluid tube for directing fluid to said cleaning nozzle; and
    c) a valve that controls flow of fluid to said cleaning nozzle.

X. A holster for cleaning a beverage dispenser, said holster comprising:
A top member having a nozzle opening for receiving a nozzle of said beverage dispenser,
A bottom member having an interior, an inlet for receiving fluid that has been pressurized into said interior, and an outlet below said inlet from which said fluid exits said bottom member;
An entry member located in said interior, said entry member including a passage therein, said passage directs said fluid from said inlet towards the nozzle opening.

Y. A holster according to claim X, wherein said entry member alters flow direction of said fluid along a non linear path within said interior.

Z. A holster according to claim Y, wherein said entry member alters flow direction of said fluid 90 degrees within said interior.

A. A method of cleaning a beverage dispenser, said method comprising the steps of:
Receiving a nozzle of said beverage dispenser into a nozzle opening;
Directing fluid that has been pressurized into a member interior at a first location below said nozzle opening;
Directing said fluid within said member interior towards said nozzle opening;
Allowing said fluid to flow out of said member interior at a second location below said first location.

B. A method according to claim A, wherein said fluid that has been pressurized flows towards said nozzle opening within said interior along a non-liner path.

C. A method according to claim B, wherein said non-linear path includes a 90 degree angle.

PARTS LIST 100 dispenser
102 inlet hose
104 housing
106 nozzle
107 dispenser nozzle
108 pushbutton
200 holster
201 interior
204 holster outlet
205 holster opening
206 holster inlet
208 front ledge (optional)
209 top member
210 back ledge
212 fastener
218 bottom member
220 gasket
224 faster opening
230 elbow member
236 slots
238 projections
240 holster interior
250 cleaning nozzle
302 container
306 support member
310 drain
311 backflow prevention device
312 solution
313 fluid tube
314 drain tube

The invention claimed is:

1. Apparatus for delivering insecticide, said apparatus comprising:
    a holster for supporting a beverage dispenser;
    a drain for receiving discharge from said beverage dispenser while stored in said holster;
    a container for storing insecticide; and
    a coupler for allowing said insecticide to first enter said drain downstream of an opening in said drain where said drain first receives said discharge from said holster.

2. Apparatus for delivering insecticide according to claim 1, wherein said container is above where said insecticide first enters said drain, so that said insecticide drips into said drain via gravity.

3. Apparatus for delivering insecticide according to claim 1, wherein a plurality of support members are coupled to said holster for holding said container.

4. Apparatus for delivering insecticide according to claim 1, further comprising a drain tube for guiding said insecticide from said container to said drain.

5. Apparatus for delivering insecticide according to claim 1, further comprising a backflow prevention device between said opening and where said insecticide first enters said drain, for preventing said insecticide from splashing upwards to said opening.

6. Apparatus for delivering insecticide according to claim 1, wherein said holster has a fluid tube coupled to a further opening for receiving pressurized liquid leading to an interior of said holster.

7. Apparatus for delivering insecticide according to claim 6, further comprising an elbow coupled to said further opening for directing said pressurized liquid upward towards said beverage dispenser.

* * * * *